US011167871B2

(12) United States Patent
Haehnel et al.

(10) Patent No.: US 11,167,871 B2
(45) Date of Patent: Nov. 9, 2021

(54) TRANSFER UNIT AND METHOD FOR TRANSFERRING BLISTER PACKS

(71) Applicant: Uhlmann Pac-Systeme GmbH & Co. KG, Laupheim (DE)

(72) Inventors: Bernd Haehnel, Stutensee (DE); Sebastian Binder, Schwendi (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 141 days.

(21) Appl. No.: 16/377,941

(22) Filed: Apr. 8, 2019

(65) Prior Publication Data

US 2019/0322400 A1 Oct. 24, 2019

(30) Foreign Application Priority Data

Apr. 23, 2018 (EP) ..................................... 18168656

(51) Int. Cl.
*B65B 35/00* (2006.01)
*B65B 35/58* (2006.01)
*B65B 35/38* (2006.01)
*B65B 35/44* (2006.01)
*B65G 47/91* (2006.01)

(52) U.S. Cl.
CPC .............. *B65B 35/58* (2013.01); *B65B 35/38* (2013.01); *B65B 35/44* (2013.01); *B65G 47/918* (2013.01)

(58) Field of Classification Search
CPC ......... B65B 35/00; B65B 35/36; B65B 35/38; B65B 35/05; B65B 35/56; B65B 35/58
See application file for complete search history.

(56) References Cited

U.S. PATENT DOCUMENTS

| 4,338,083 A * | 7/1982 | Andrae | .................... B65B 61/28 493/239 |
| 5,862,646 A * | 1/1999 | Orillo | ..................... B65B 57/14 53/53 |
| 6,209,293 B1 * | 4/2001 | Powers | ................... B65B 5/105 53/244 |
| 7,073,312 B2 * | 7/2006 | Battisti | .................. B65B 35/38 198/468.3 |

(Continued)

FOREIGN PATENT DOCUMENTS

DE 10 2004 043332 A1 3/2006
EP 0 842 878 A1 5/1998

(Continued)

OTHER PUBLICATIONS

International Search Report for European Application No. 18168656.9, dated Aug. 10, 2018, 7 pgs.

*Primary Examiner* — Chelsea E Stinson
(74) *Attorney, Agent, or Firm* — Dickinson Wright PLLC

(57) ABSTRACT

Several blister packs are picked simultaneously from pick positions, where they are arranged next to each other in a first row, moved, and placed simultaneously in several place positions. In the place positions, the blister packs are also arranged next to each other in a second row, which is parallel to the first row of the blister packs in the pick positions. The blister packs are placed in the place positions with a rotation of 180° around their centers in comparison to their orientation in the pick positions. The second row of blister packs in the place positions is laterally offset in the direction of the second row relative to the first row of blister packs in the pick positions.

13 Claims, 21 Drawing Sheets

(56) References Cited

U.S. PATENT DOCUMENTS

| | | | | |
|---|---|---|---|---|
| 7,690,498 B2* | 4/2010 | Hahnel | ............... | B65G 47/918 198/476.1 |
| 7,934,355 B2* | 5/2011 | Strub | ..................... | B65B 5/103 53/55 |
| 9,260,212 B2* | 2/2016 | Monti | ................... | B65B 43/305 |
| 10,640,305 B2* | 5/2020 | Haehnel | ................. | B65B 35/44 |
| 2007/0251804 A1* | 11/2007 | Hahnel | ............... | B65G 47/918 198/469.1 |
| 2015/0056046 A1* | 2/2015 | Haehnel | ................. | B65B 35/50 414/222.08 |
| 2019/0322399 A1* | 10/2019 | Haller | .................... | B65B 35/44 |
| 2019/0322469 A1* | 10/2019 | Haehnel | ................. | B65B 35/50 |
| 2019/0322470 A1* | 10/2019 | Haehnel | ................. | B65B 35/44 |
| 2019/0322471 A1* | 10/2019 | Haehnel | ................. | B65B 35/38 |

FOREIGN PATENT DOCUMENTS

| EP | 2 840 029 A1 | 2/2015 |
|---|---|---|
| WO | WO 2014/181307 A1 | 11/2014 |

* cited by examiner

TRANSFER UNIT AND METHOD FOR TRANSFERRING BLISTER PACKS

RELATED APPLICATIONS

This application claims priority to European Patent Application No. 18 168 656.9, filed on Apr. 23, 2018, entitled "Transfer Unit And Method For Transferring Blister Packs", the contents of which are incorporated herein by reference in their entirety.

FIELD

The present disclosure relates to a transfer unit and a method for transferring blister packs.

BACKGROUND

Blister packs are frequently used in the pharmaceutical industry for the packaging of medications. A plurality of pockets, into which products such as sugar-coated pills or tablets are introduced, are first formed in a film web. After the pockets have been filled, the film web is sealed with a lidding foil and then sent to a stamping station, in which the individual blister packs are stamped out from the film web.

In another phase of the packaging process, the stamped-out blister packs are transferred to a conveying means by the use of a transfer device. The blister packs are placed in individual receptacles of the conveying means to form stacks. Then the stacks of blister packs arranged on the conveying means are sent to a packaging station, where the stacks of blister packs are introduced into appropriate packaging such as folding boxes. The time which the transfer device requires to transfer blister packs from the stamping station to the conveying means logically has an influence on the throughput of the overall packaging machine.

BRIEF SUMMARY

The present disclosure provides an improved transfer unit and a method for transferring blister packs, wherein the transfer of the blister packs proceeds with an especially high degree of efficiency, precision, and speed.

According to an aspect of the present disclosure, the transfer unit for transferring blister packs comprises a suction arm, which can be moved between a picking position, in which it can pick several blister packs from several pick positions, and a placing position for placing several blister packs in several place positions. The suction arm comprises a first segment and a second segment, wherein the first segment of the suction arm is mounted so that it can rotate around an associated first axis. The first segment of the suction arm comprises a section to which the second segment is attached in such a way that it can rotate around a non-stationary second axis, which is substantially perpendicular to the first axis. A suction device for drawing up and holding a blister pack is arranged on the second segment. The suction arm is configured and actuated in such a way that the movement of the suction arm from the picking position to the placing position and back is a combination movement, which consists at least of a first rotational movement of the first segment and of the second segment around the first axis and of a second rotational movement of the second segment around the second axis. The suction arm is configured and actuated in such a way, furthermore, that the blister packs in the pick positions are picked simultaneously by the suction device of the suction arm and also placed simultaneously in the place positions, wherein the several pick positions are arranged next to each other in a row and form jointly a pick position area, and wherein the several place positions are arranged next to each other in a row and form jointly a place position area. These rows are parallel to each other. The second axis of the suction arm is arranged in such a way that, during the first rotational movement of the first segment of the suction arm, it moves in a plane which intersects the pick position area or its lateral projection along a straight line, which is laterally offset from the center of the pick position area.

This guarantees a reliable transfer of the blister packs, during which the blister packs are transferred to several place positions in a simple manner and with high throughput, and at the same time the blister packs acquire a lateral offset.

The second segment and thus the blister packs held on the suction device preferably execute a rotational movement of substantially 180° around the second axis when the suction arm moves from the picking position to the placing position or vice versa. This rotational movement represents a simple way of ensuring that the blister packs are rotated 180° during the transfer operation. This guarantees in turn that the blister packs can be placed with their lidding foil side facing up.

The first segment preferably executes a rotational movement of 60-180°, preferably of 120-180°, around the first axis when the suction arm moves from the picking position to the placing position or vice versa. It is conceivable that the suction device could project at a slant from the second segment of the suction arm, so that the first segment would merely have to be pivoted around the first axis by an angle of less than 180°, which is the angle around which the blister packs must travel from the pick positions to the place positions.

The suction arm can be configured and actuated in such a way that the blister packs are picked from the pick positions by the suction device of the suction arm from above and also placed from above in the place positions.

The rotational movement of the blister packs around their centers is preferably achieved in that, when the suction arm is in the picking position, the second segment of the suction arm pivots around the second axis in the direction opposite to that in which it pivots when in the placing position.

So that the suction arm can be adapted to blister packs of different formats, it can be supported so that it can be shifted in a direction parallel to the first axis.

It is preferred that the suction device comprise several suction heads, which are attached to the second segment by at least one support arm. It is especially preferred that the at least one support arm be attached rigidly to the second segment.

To reduce the angle around which the first segment must rotate, the at least one support arm can project downward at a slant when in the picking and placing positions.

According to another aspect of the present disclosure, the method for transferring blister packs from several pick positions to several place positions by means of a transfer unit comprises the picking of several blister packs from the several pick positions, wherein the blister packs are arranged in the pick positions next to each other in a row; the moving of the blister packs; and the placing of the blister packs in the several place positions, wherein the blister packs are arranged in the place positions next to each other in a row parallel to the row of the blister packs in the pick positions. The blister packs in the pick positions are picked simultaneously and also placed simultaneously in the place positions; and the blister packs are placed in the place positions after having been rotated 180° around their centers in comparison to their orientation in the pick positions. The row of blister packs in the place positions is offset laterally, in the direction of the row, relative to the row of the blister packs in the pick positions.

This guarantees a reliable transfer of the blister packs, during which blister packs are transferred to several place positions in a simple manner and with high throughput, and also during which the blister packs acquire a lateral offset.

The picking of the blister packs from the pick positions, the moving, and the placing in the place positions are performed by a suction arm, which executes a back-and-forth pivoting movement. In this way, the blister packs are treated gently and are transferred with high throughput.

It is preferred that, in the case of an even number of blister packs, all of the blister packs are placed in place positions which are exchanged in comparison to the pick positions; or, in the case of an odd number of blister packs, all of the blister packs except for the blister pack in the middle are placed in place positions which are exchanged in comparison to the pick positions.

The transfer can be configured especially easily if the blister packs are picked from the pick positions from above and if the blister packs are arranged in the pick positions and in the place positions with the same side facing up. The blister packs are preferably arranged in the pick positions and in the place positions with the lidding foil facing up.

DETAILED DESCRIPTION

Figure 1:
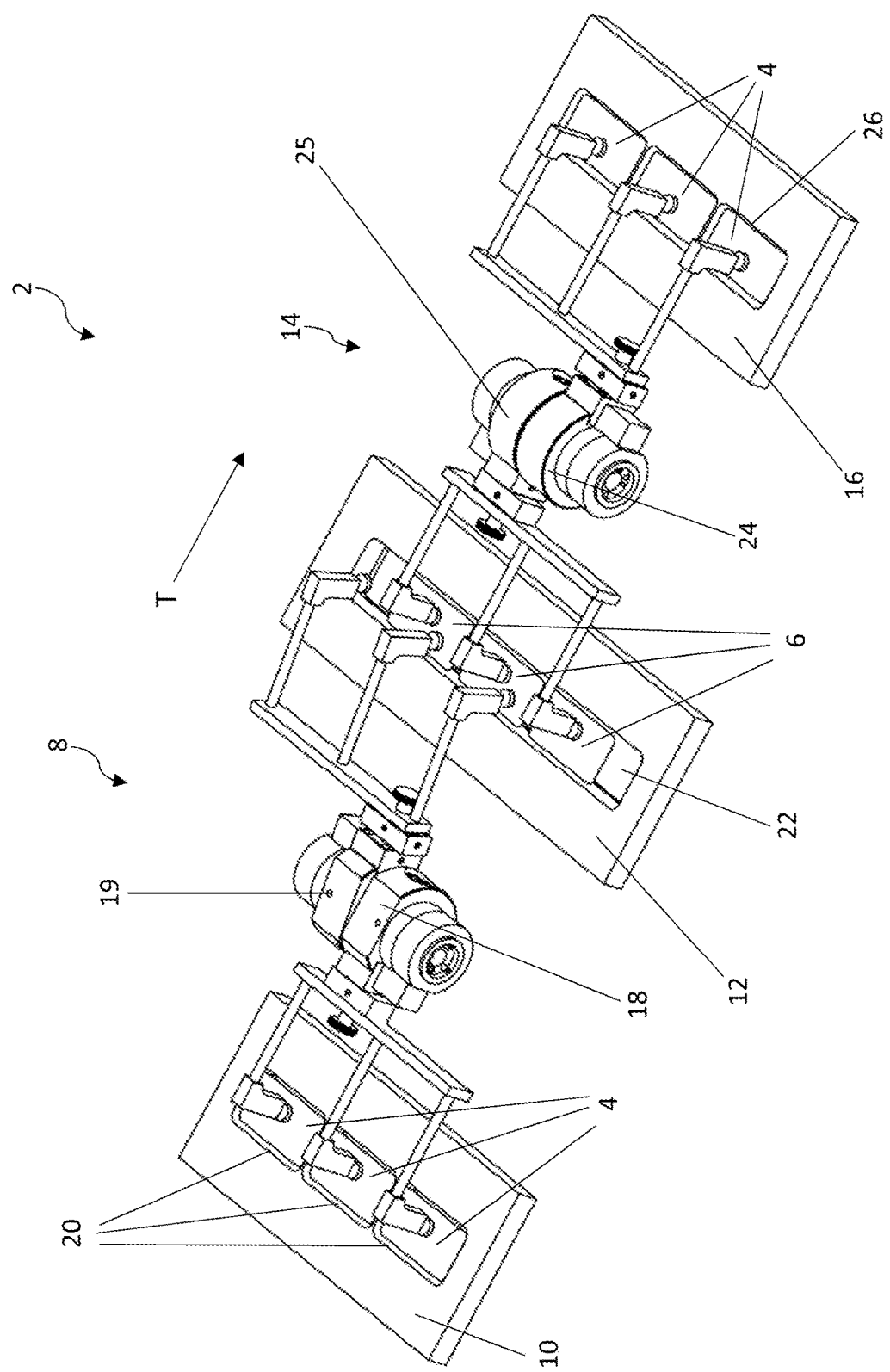
FIG. 1 is a schematic diagram, in perspective, of a device for transferring blister packs with transfer units according to the present disclosure.

FIGS. 1-6 show a device 2 for transferring blister packs 4, 6. In FIG. 1 and FIGS. 3-6, the device 2 for transferring blister packs 4, 6 is shown in various stages of the transfer process. FIGS. 2a and 2b are top views of the device 2.

The device 2 for transferring blister packs 4, 6 comprises a first transfer unit 8, which transfers the blister packs 4, 6 from a stamping station 10 to an intermediate place area 12, and a second transfer unit 14, which transfers the blister packs 4, 6 from the intermediate place area 12 to a conveying means 16. The transfer direction of the blister packs 4, 6 is indicated in the figures by the arrow T.

The stamping station 10, the intermediate place element 12, and the conveying means 16 are illustrated merely schematically in the figures. The blister packs 4, 6 are usually provided in the area of the stamping station 10 immediately after the stamping operation. It is also possible, however, that a transport means (not shown) could be provided in the output area of the stamping station 10 to transport the blister packs 4, 6 onward after the stamping operation until they can be gripped by the first transfer unit 8. A transport means of this type preferably moves in stepwise fashion and in the transfer direction T. Finally, it is also possible that the blister packs 4, 6 could be stored initially in an intermediate storage area (not shown) after the stamping operation, from which the transfer unit 8 would then remove the blister packs 4, 6 located above or in front of it.

The conveying means 16 preferably moves in the transfer direction T. The conveying means 16 can be configured as an endless packaging-goods chain, which moves continuously or in stepwise fashion. It is also conceivable that the conveying means 16 could be configured as a linear motor system. If the conveying means 16 is moved in stepwise fashion or if the individual slides of the endless linear motor system stand still during the transfer in the position in which the blister packs 4, 6 are supplied to them, stacks of two or more blister packs 4, 6, one lying on top of the other, can be formed in the compartments of the conveying means 16. It is also conceivable that the blister packs 4, 6 could be transferred initially to a storage area (not shown) rather than directly to the conveying means 16.

The first transfer unit 8 comprises a first suction arm 18 and a second suction arm 19. The first suction arm 18 and the second suction arm 19 are arranged next to each other in a row, transversely to the transfer direction (see FIG. 2a). The first suction arm 18 can be moved between a picking position, shown in FIG. 2b, in which it can pick first blister packs 4 from ready positions 20 in the stamping station 10, and a placing position (FIG. 2a), in which it can place the first blister packs 4 in intermediate place positions 22 on the intermediate place element 12.

Figure 2A:
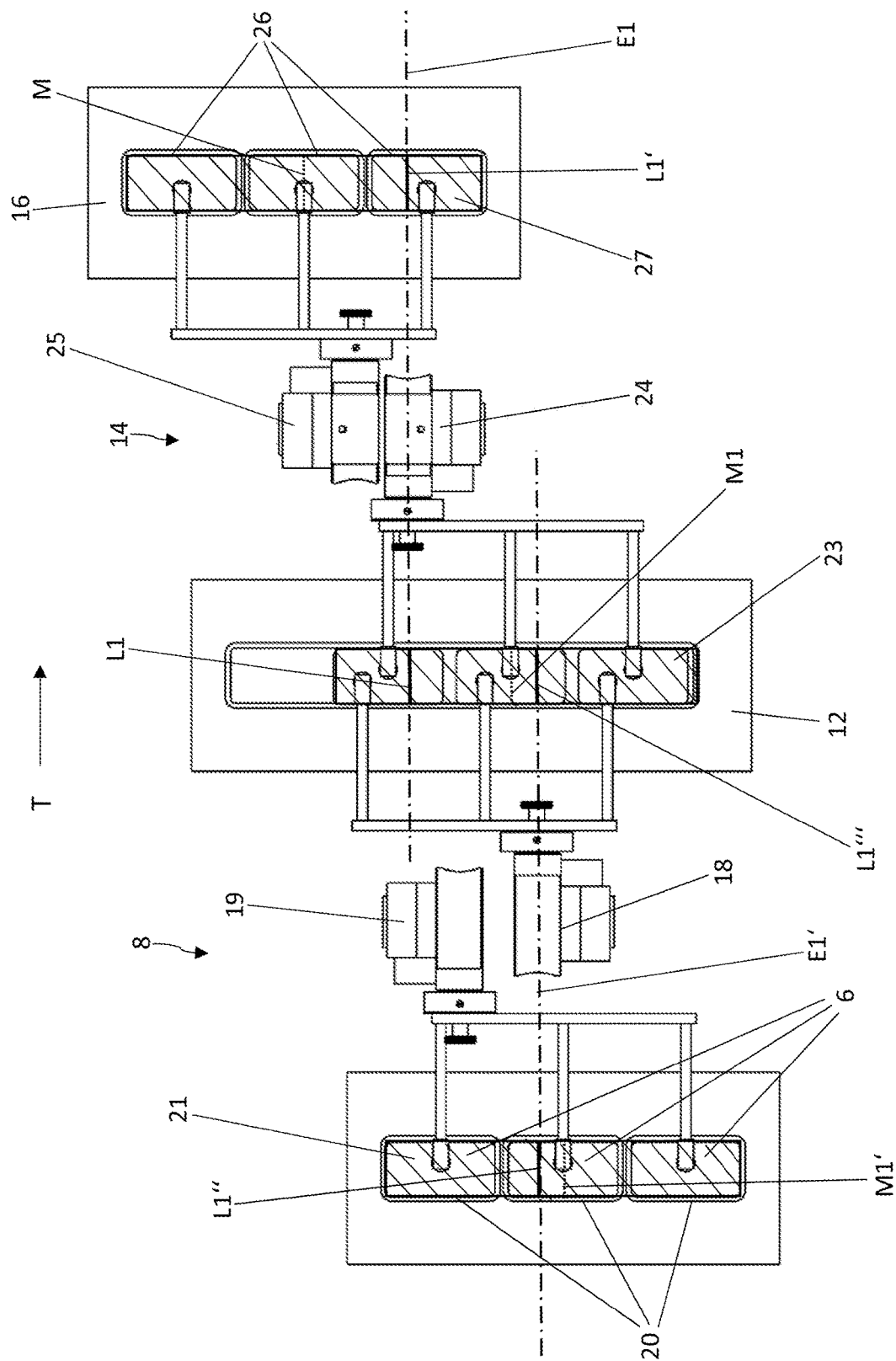
FIGS. 2a and 2b are top views of devices like that of FIG. 1 in various stages of the transfer process.
Figure 2B:
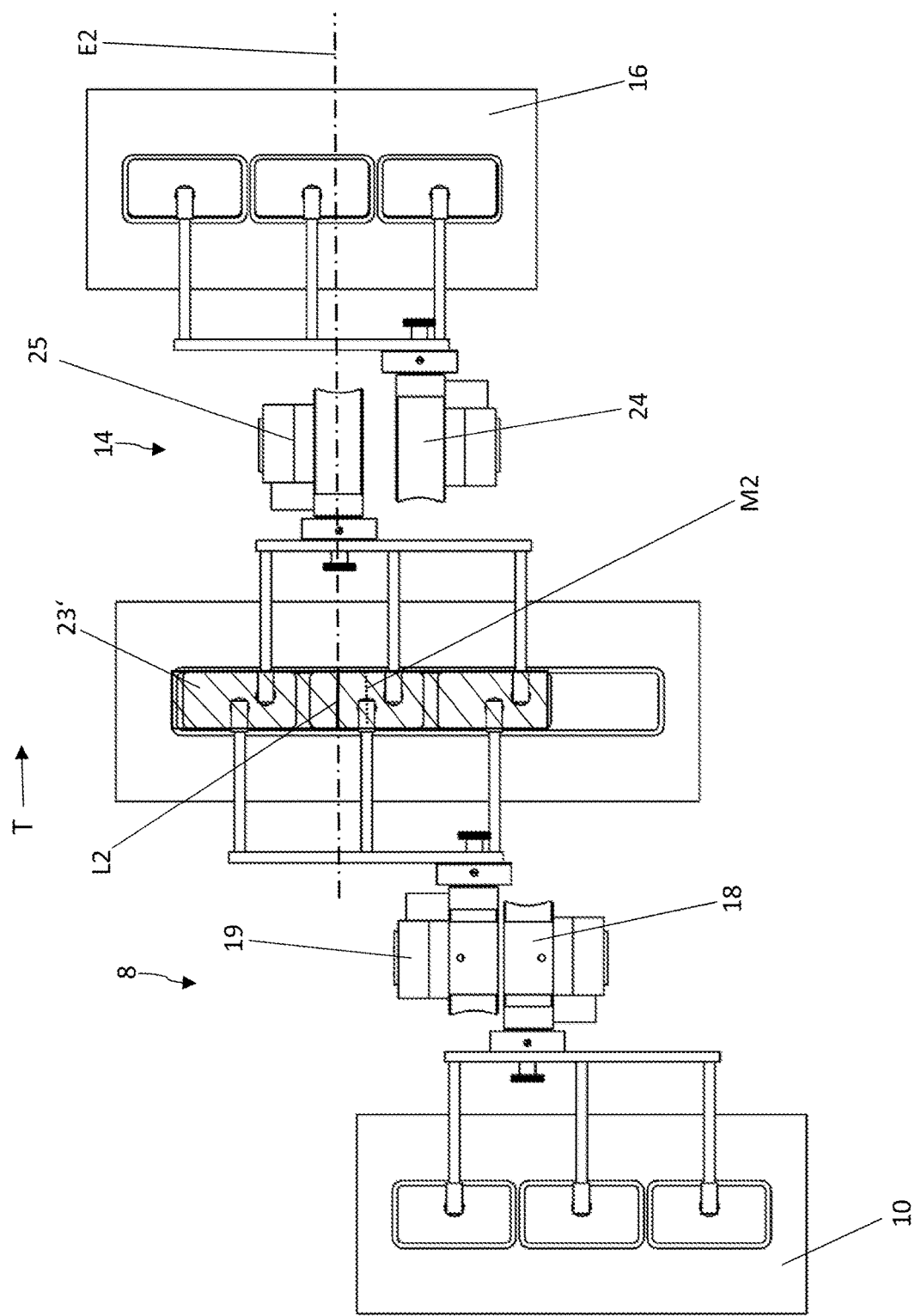

The second suction arm 19 can also be moved between a picking position, in which it can pick second blister packs 6 from the ready positions 20 (see FIG. 2a) and a placing position, in which it can place the second blister packs 6 in the intermediate place positions on the intermediate place element 12 (FIG. 2b).

In the preferred embodiment shown here, the suction arms 18, 19 are actuated in such a way that they execute opposite movements as they travel from their picking position to their placing positions and back. Each suction arm 18, 19 can transfer several blister packs 4, 6 simultaneously. In this way, the blister packs 4, 6 are picked simultaneously by the first transfer unit 8 from the ready positions 20 of the stamping station 10 and also placed simultaneously in the intermediate place positions 22 on the intermediate place element 12. In addition to the embodiment shown here, there are many other possible ways of configuring the first transfer unit 8. For example, it is conceivable that the blister packs 4, 6 could be transferred by means of a single suction arm. It is also conceivable that gripper devices could be used instead of the suction arms 18, 19.

The second transfer unit 14 comprises a first suction arm 24 and a second suction arm 25, which are arranged next to each other in a row, transversely to the transfer direction T. The first suction arm 24 can be moved between a picking position (see FIG. 2a), in which it can pick the blister packs 4 from the intermediate place positions 22 on the intermediate place element 12, and a placing position (see FIG. 2b), in which it can place the first blister packs 4 in the final place positions 26 on the conveying means 16.

The second suction arm 25 of the second transfer unit 14 can be moved between a picking position (see FIG. 2b), in which it can pick the second blister packs 6 from the intermediate place positions 22 on the intermediate place element 12, and a placing position (see FIG. 2a), in which it can place the second blister packs 6 in the same final place positions 26 in which the first suction arm 24 placed the first blister packs 4.

The two suction arms 24, 25, aside from the points at which their suction devices 34 are attached, are arranged and configured with mirror-symmetry to a longitudinal center plane of the transfer unit 14. The two suction arms 24, 25 execute opposite back-and-forth pivoting movements. When the first suction arm 24 is in the picking position, the second suction arm 25 is in its placing position or is at least near the placing position. When the first suction arm 24 is in the placing position, the second suction arm 25 is in its picking position or at least near its picking position. The picking position of the first suction arm 24 differs with respect to its physical configuration in space from the placing position of the second suction arm 25. The placing position of the first suction arm 24 also differs from the placing position of the second suction arm 25.

The ready positions 20 in the stamping station 10, the intermediate place positions 22 on the intermediate place element 12, and the final place positions 26 on the conveying means 16 are each preferably configured to accommodate the shape of the blister packs 4, 6 to be transferred. In the case of conventional blister packs 4, 6, the cited positions will therefore have a substantially rectangular shape. In the embodiment shown here, the above-cited positions are each arranged in such a way that the longer sides of the positions are transverse to the transfer direction T. As can be seen in FIG. 2a, the intermediate place positions 22 are arranged in a row parallel to the row of ready positions 20, and the final place positions 26 are arranged in a row parallel to the row of intermediate place positions 22. All of the rows are parallel to the first axis A1 of the suction arms 24, 25 (see FIG. 7). What happens is a lateral offset of the blister packs 4, 6 transversely to the transfer direction T between the ready positions 20 and the intermediate place positions 22 and again between the intermediate place positions 22 and the final place positions 26. The ready positions 26 form a ready position area 21 (shown with shading in FIG. 2a). The intermediate place positions 22 for the first suction arm 24 form together an intermediate place positions area 23 (shown with shading in FIG. 2a), and the intermediate place positions 22 for the second suction arm 25 form together an intermediate place area 23' (shown with shading in FIG. 2b). The final place positions 26 form together a final place positions area 27 (shown with shading in FIG. 2a). Whereas the ready position area 21 is the same for both suction arms 18, 19, the intermediate place position area 23 of the first suction arm 18 is laterally offset from the intermediate place position area 23' of the second suction arm 19. The suction arms 24, 25 thus pick the blister packs 4, 6 from the intermediate place positions areas 23, 23', respectively, and place them in the same final place position area 27.

Details of the second transfer unit 14 will now be described with reference to FIGS. 7-10. As can be seen from FIG. 7, the first suction arm 24 comprises a first segment 30 and a second segment 31. The first segment 30 of the first suction arm 24 is mounted so that it can rotate around a first axis A1, which is perpendicular to the longitudinal center plane L. The first segment of the first suction arm 24 comprises a section to which the second segment 31 is attached so that it can rotate around a second axis A2 substantially perpendicular to the first axis A1. A suction device 34 for drawing up and holding the blister packs 4 is arranged on the second segment 31.

The second suction arm 25 also comprises a first segment 32 and a second segment 33. The first segment 32 of the second suction arm 25 is mounted so that it rotate around the same first axis A1. The first segment 32 of the second suction arm 25 also comprises a section to which the second segment 33 is attached so that it can rotate around another, non-stationary axis A2' substantially perpendicular to the first axis A1. A suction device 34 for drawing up and holding blister packs 6 is also arranged on the second segment 33.

The suction arms 24, 25 are configured and actuated in such a way that the movement of the suction arms 24, 25 from their picking positions to their placing positions and back is a combined movement, which consists at least of a first rotational movement of the first segment 30, 32 and of the second segment 31, 33 around the first axis A1 and a second rotational movement of the second segment 31, 33 around the associated second axis A2, A2'.

As can be derived from FIG. 2a, the second axis A2 of the first suction arm 24 is arranged in such a way that, during the first rotational movement around the first axis A1, it moves in a first plane E1, which intersects the intermediate place position area 23 or its lateral projection along a first straight line L1. This first straight line L1 is laterally offset from the center M1 of the intermediate place position area 23. The plane E1 also intersects the final place position area 27 or its lateral projection along a straight line L1', which is laterally offset from the center M of the final place position area 27.

The second axis A2' of the second suction arm 25 is arranged in such a way that, during the first rotational movement of the second suction arm 25 around the first axis A1, it moves in a second plane E2 (FIG. 2b), which intersects the intermediate place positions area 23' or its lateral projection along a second straight line L2, which is laterally offset from the center M2 of the intermediate place positions area 23'. The plane E2 also intersects the final place position area 27 or its lateral projection along a straight line (not shown), which is laterally offset from the center M of the final place position area 27.

The second axis A2 of the first suction arm 18 of the first transfer unit 8 is also arranged in such a way that, during the first rotational movement of the first suction arm 18 around the first axis A1, it moves in a plane E1' (FIG. 2a), which intersects the intermediate place position area 23 or its lateral projection along a straight line L'", which is laterally offset from the center M1 of the intermediate place positions area 23. The plane E1' also intersects the ready position area 21 or its lateral projection along a straight line L", which is laterally offset from the center M1' of the ready position area 21 (FIG. 2a).

Finally, the second axis A2 of the second suction arm 19 of the first transfer unit 8 is arranged in such a way that, during the first rotational movement of the first suction arm 18 around the first axis A1, it moves in a plane (not shown), which intersects the intermediate place position area 23' or its lateral projection along a straight line (not shown), which is laterally offset from the center M2 of the intermediate place position area 23'. This plane also intersects the ready position area 21 or its lateral projection along a straight line (not shown), which is laterally offset from the center M1' of the ready position area 21.

Figure 7:
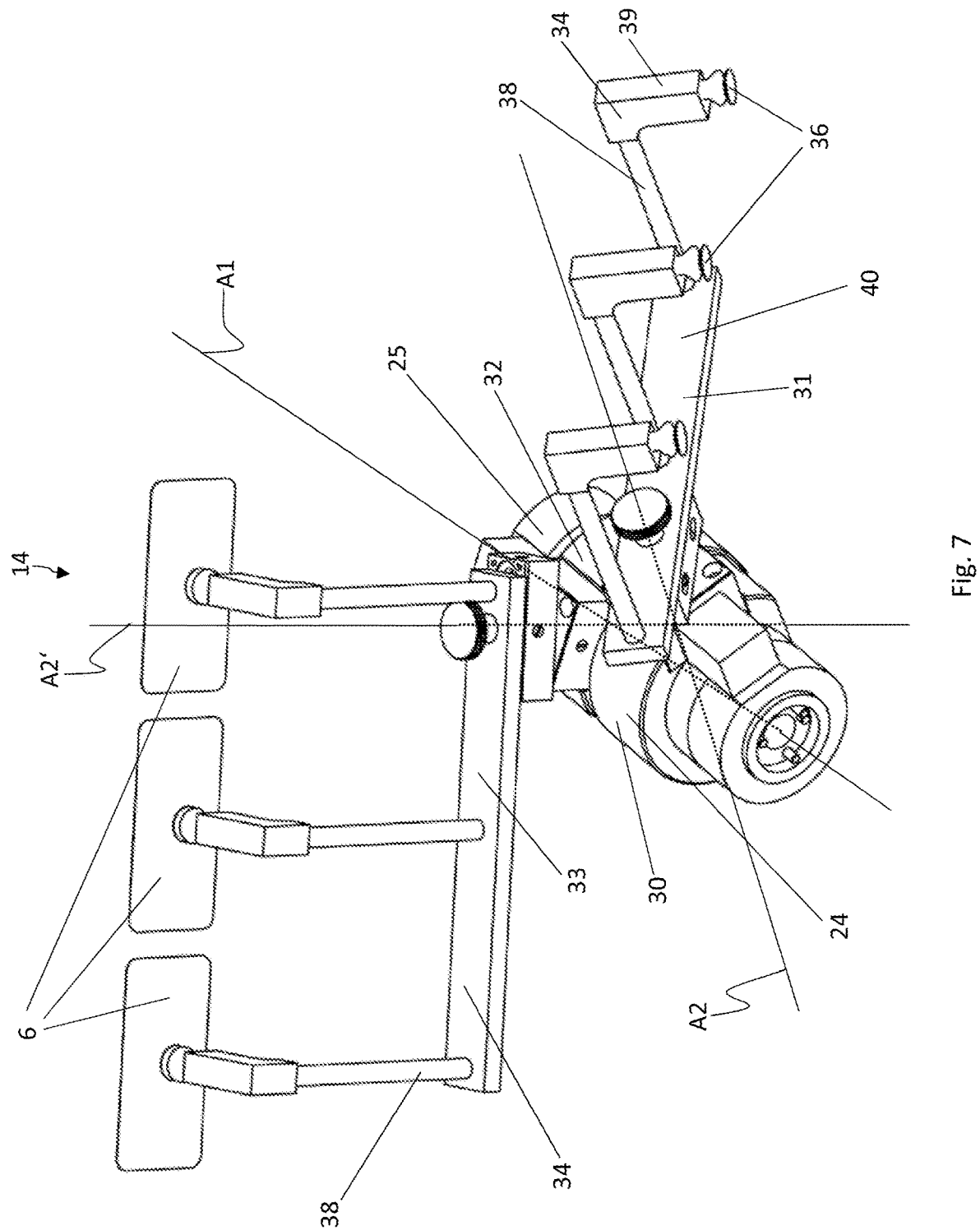
FIG. 7 is a schematic diagram, in perspective, of two suction arms used in the second transfer unit of the device according to FIG. 1.

As shown in FIG. 7, the suction device 34 of each suction arm 24, 25 comprises several suction heads 36, which are attached to the second segment 31, 33 by means of a support arm 38. At least one suction head 36 is provided for each blister pack 4, 6. Several separate support arms 38 for connecting to the second segment 31, 33 can also be present. In the embodiment shown, the support arm 38 is configured in the form of a rake and comprises several fingers 39, on the tip of each of which a suction head 36 is arranged. The support arm 38 is preferably attached rigidly to the second segment 31, 33. In the embodiment shown here, the fingers 39 of the support arm 38 project perpendicularly from a common connecting strut 40. The connecting strut 40 is connected in turn to the second segment 31, 33 by means of a connecting member 42 perpendicular to it. In the embodiment shown, the connecting member 42 of the support arm 38 is connected perpendicularly to the second segment 31, 33. It is also conceivable that the connecting member 42 and thus the support arm 38 could project at a slant from the second segment 31, 33. In the associated picking and placing positions of the suction arms 24, 25, the connecting member 42 and thus the support arm 38 would then project downward at a slant. As a result, the angle around which the suction arm 24, 25 in question must travel around the first axis A1 can be reduced.

As can be seen from FIGS. 2a and 7, the second segment 31, 33 of the first or second suction arm 24, 25, when in the associated picking position, is pivoted in a first direction relative to the longitudinal center plane of the transfer unit 14. In concrete terms, the section of the second segment 31, 33 to which the support arm 38 is attached is pivoted in the first direction. It can also be seen that the second segment 31, 33 of the first or second suction arm 24, 25—in concrete terms the section of the second segment 31, 33 to which the support arm 38 is attached—when in the associated placing position is pivoted in a second direction, opposite the first direction, relative to the longitudinal center plane of the transfer unit 14.

Details of a possible drive for the suction arm 24 will now be described with reference to FIGS. 8-10.

Figure 8:
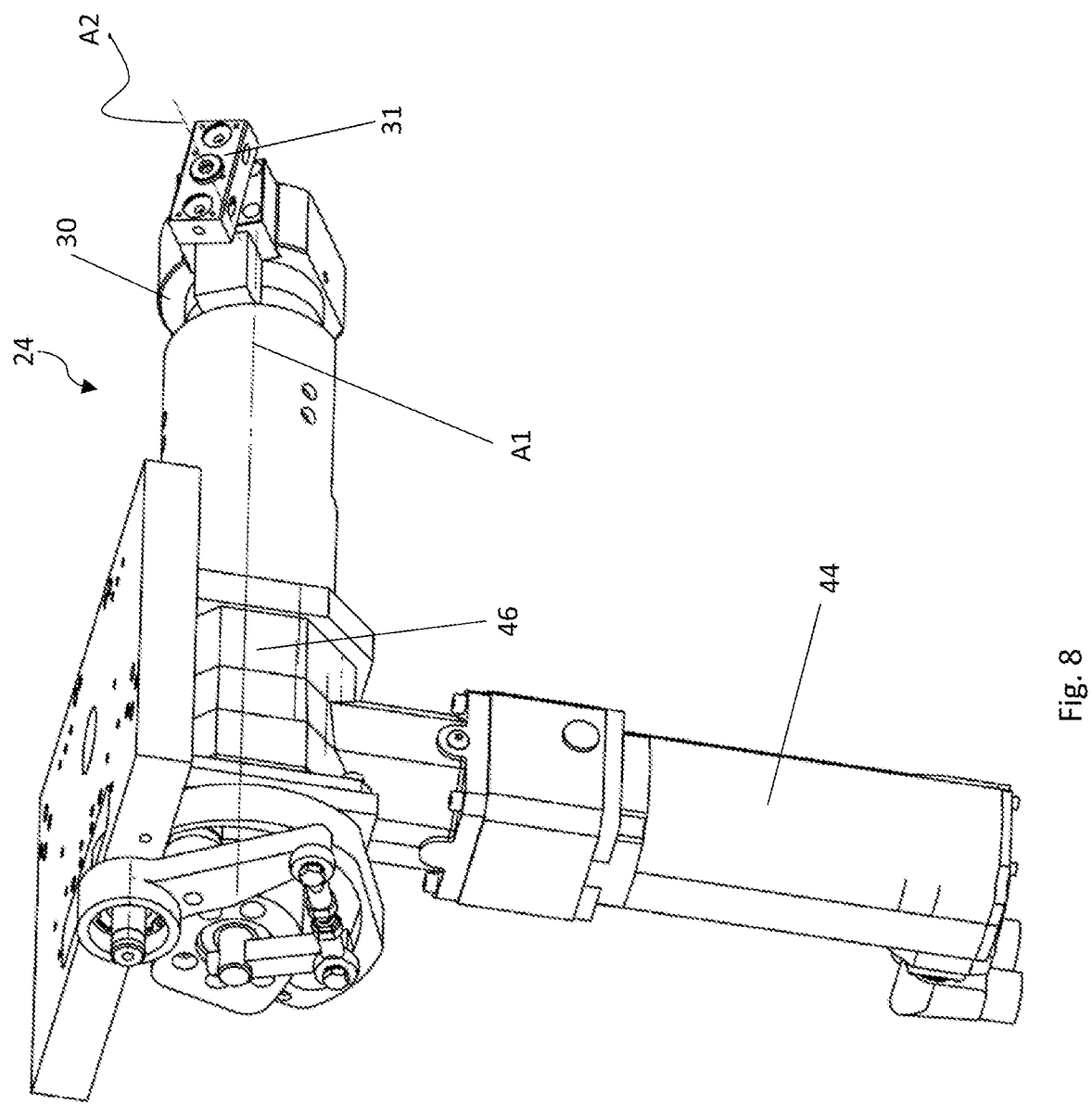
FIG. 8 is a schematic diagram, in perspective, of essential drive components of a suction arm according to FIG. 7.

In FIG. 8 a motor 44 can be seen, which pivots the first segment 30 back and forth around the first axis A1 by way of a gear unit 46. The second segment, which can pivot around the second axis A2, is shown without the suction device 34 attached to it. The suction device 34 is preferably a format-dependent part, which can be exchanged depending on the type and size of the blister packs 4, 6 to be transferred. So that the support arm 38 of the suction device 34 can be attached to, and detached from, the second segment 31, a knurled screw 48 (see FIG. 9) is preferably provided. So that the suction arms 24, 25 can be further adapted to different formats, they can also be supported in such a way that they can be shifted parallel to the first axis A1 and/or in the longitudinal direction.

Figure 9:
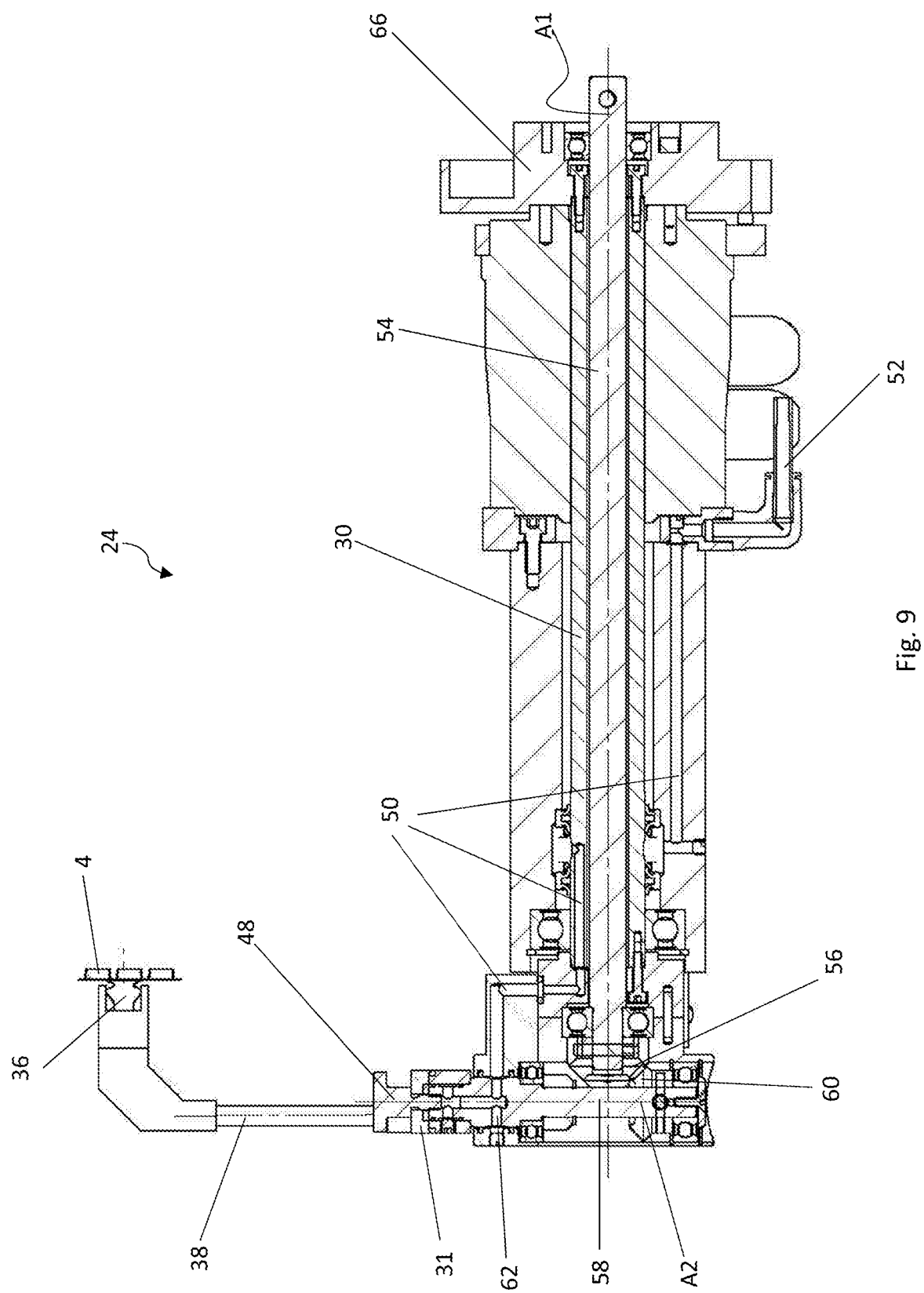
FIG. 9 is a cross-sectional view illustrating the internal structure of a suction arm according to FIG. 7.

The motor 44 and the gear unit 46 are not shown in the cross-sectional view of FIG. 9. The first segment 30 of the suction arm 24, which is configured as a hollow shaft, is driven by the motor 44. When the motor 44 is actuated, the first segment 30 is pivoted back and forth around the first axis A1. The second segment 31 is supported in a section of the first segment 30 so that it can rotate around the second axis A2. Air channels 50, which are connected to a vacuum connector 52 for the suction heads 36, are provided in the first segment 30. In the interior of the first segment 30, furthermore, a shaft 54 is arranged, to one end of which, i.e., the end facing the second segment 31, a bevel gear 56 is rigidly attached.

The second segment 31 comprises a central shaft 58, which is supported rotatably in the end section of the first segment 30 and which, upon a rotational movement of the first segment 30 around the first axis A1, turns along with the first segment 30. Connected rigidly to the shaft 58 is another bevel gear 60, which, when the first and second segments 30, 31 turn around the first axis A1, meshes with the bevel gear 56. An annular groove 62 in the shaft 58 serves to produce a connection with the air channels 50 in the first segment 30 even during a rotational movement of the second segment 31 around the second axis A2.

When the first segment and thus also the second segment 31 are pivoted around the first axis A1, the bevel gear 60 runs over the unmoving bevel gear 56 and thus causes the shaft 58 to rotate around the second axis A2. At a ratio of 1:1 between the bevel gears 56, 60, therefore, a pivoting of the first segment 30 and of the second segment 31 by 180° around the first axis A1, as is desired for the transfer processes illustrated in FIGS. 1-6, also results in a rotation of the second segment 31 of 180° around the second axis A2. The second segment 31 and the blister packs 4 held by the suction device 34 thus execute a rotational movement around the second axis A2 of substantially 180° when the suction arm 24 moves from its picking position to its placing position or vice versa. If, in the picking and placing positions, the suction device 34 projects downward at a slant, the first segment 30 can travel around an angle of less than 180°, possibly an angle of only 120°, during the pivoting movement around the first axis A1. In this case, the ratio between the bevel gears 56, 60 would have to be adapted accordingly, because the second segment 31 must in all cases complete a rotational movement of 180° around the second axis A2.

The rotational movement of the second segment 31 around the second axis A2 in combination with the pivoting movement around the first axis A1 has the effect that the blister packs 4 can be gripped on one side, preferably on the flat surface of the lidding foil, by the suction heads 36 and can then be placed from above in the final place positions 26. As this is happening, the blister packs 4 complete a 180° rotation around their centers.

In a departure from the basic principle described above, it is desirable for the second segment 31 not to rotate around the second axis in the final phases of the pivoting movement around the first axis A1. The reason for this is that, for an effective picking and placing of the blister packs 4, it is advantageous for the blister packs 4 to be raised and lowered in a straight line in the end phases of the movement. To achieve this purpose, a mechanism 64 for adapting the course of the rotation of the second segment around the second axis A2 can be provided in the second transfer unit 14.

This mechanism 64 will now be described in greater detail with reference to FIG. 10. In FIG. 10, the end of the first segment 30, to which the second segment 31 and the suction device 34 are attached, has been omitted for the sake of clarity. The mechanism 64 comprises a cam disk 66, which rotates around the first axis A1 jointly with the first segment 30. This cam disk 66 is also shown in the cross-sectional view of FIG. 9 but without the other components of the mechanism 64.

Figure 10:
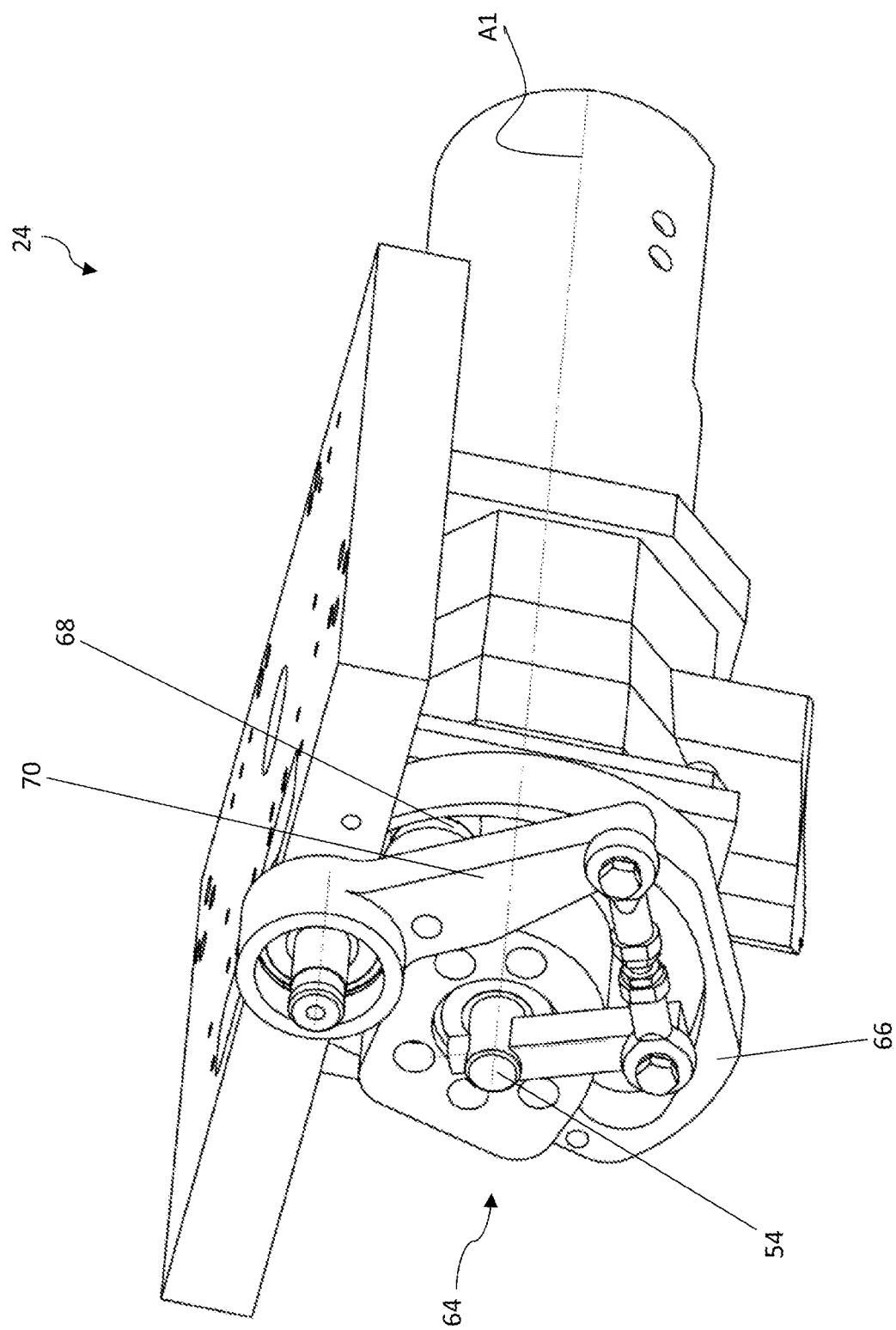
FIG. 10 is a schematic diagram, in perspective, of a mechanism for adapting the rotational movement of the second segment of the suction arm of FIG. 9 around the second axis.
Figure 11:
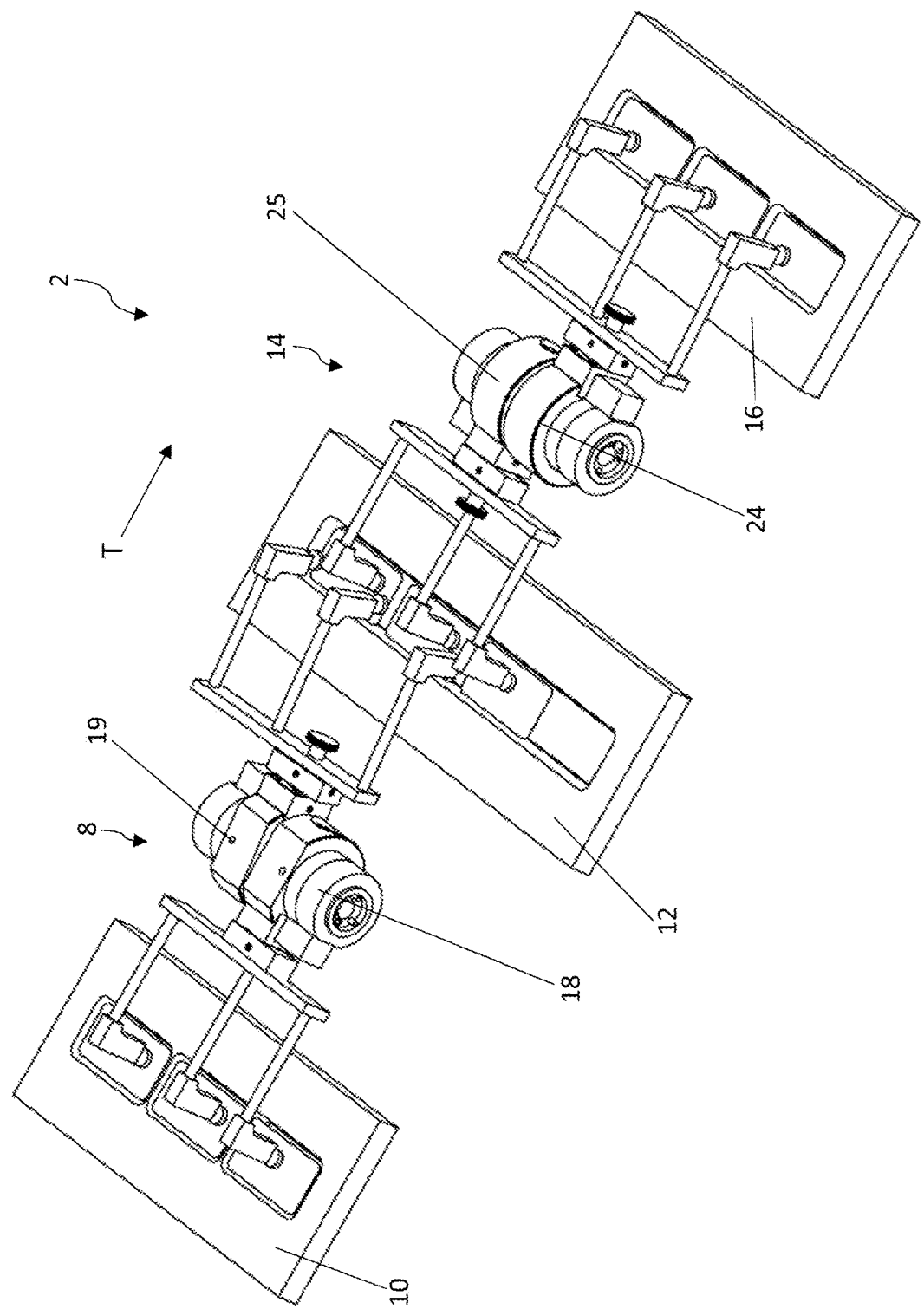
FIG. 11 is a schematic diagram, in perspective, of a device with a variant of the transfer units according to the present disclosure.

Again as shown in FIG. 10, the mechanism 64 also comprises a cam roller 68, which is articulated rotatably to a lever mechanism 70. The lever mechanism 70 is rigidly connected in turn to the inner shaft 54, on the other end of which the bevel gear 56 is arranged. When the cam disk 66 rotates around the first axis A1, the cam roller 68 runs along the cam disk 66 and thus bring about a corresponding deflection of the lever mechanism 70, which leads in turn to a rotation of the shaft 54 around the first axis A1. The mechanism 64 is configured in such a way that, during the initial final phases of the rotational movement of the first segment 30 and thus of the cam disk 66 around the first axis A1, the shaft 54 and thus the bevel gear 56 move along at the same angular velocity as the first segment 30. As a result, there is no relative movement between the bevel gear 56 and the bevel gear 60, which also means that no rotational movement of the second segment 31 around the second axis A2 is initiated.

During the further course of the pivoting movement around the first axis, however, the mechanism 64 causes the shaft 54 to move in a direction opposite to the rotational direction of the first segment 30, as a result of which the rotational speed of the second segment 31 around the second axis A1 is faster in a certain area than the rotational movement around the first axis A1. In this way, it is possible to suspend the rotational movement of the second segment 31 around the second axis A2 at the end phases of the pivoting movement around the first axis A1 and to compensate for this in the middle area of the pivoting movement around the first axis A1 by increasing the rotational speed of the second segment 31 around the second axis A2. This guarantees that the blister packs 4 will always complete a rotational movement of 180° around the second axis A2.

There are, of course, many different ways in which the structure of the suction arm 24 and the associated drive described above can be modified. For example, the coupling between the pivoting movement of the first segment 30 around the first axis A1 and the rotational movement of the second segment 31 around the second axis A2 can also be achieved by means of different mechanical components. It is also conceivable that two separate servo motors could be provided, one for the drive of the first segment 30, another for the drive of the second segment 31.

The structure of the suction arm 25 is substantially mirror-symmetric to that of the suction arm 24, wherein the first segment carries the designation 32, the second segment the designation 33, and the second axis the designation A2'.

The sequence of steps of a transfer process with the above-described device 2 will now be explained with reference to FIGS. 1-6. The blister packs 4, 6 in the ready positions 20 in the stamping station 10 are picked by the first and second suction arms 18, 19 of the first transfer unit 8, moved to the intermediate place positions 22, and placed there. The blister packs 4, 6 in the ready positions 20 are preferably picked from above by the first transfer unit 8 and also placed from above on the intermediate place element 12 in the intermediate place positions 22.

Because of the combined rotational movements around the two axes, which are perpendicular to each other, the blister packs 4, 6, which are arranged in a transverse row in the ready positions 20, are placed in the intermediate place positions 22 with the same side facing up as they did when in the ready positions 20 but now with a rotation of 180° around their centers. Under certain circumstances, it is also possible that the blister packs 4, 6 could be provided in the ready positions 20 with a vertical orientation, for example, or at a certain angle to the vertical, instead of being oriented horizontally. In this case, the suction arms 18, 19 would complete a pivoting movement around the first axis only around an angle of less than 180°, usually around an angle in the range of 60-180°.

Figure 3:
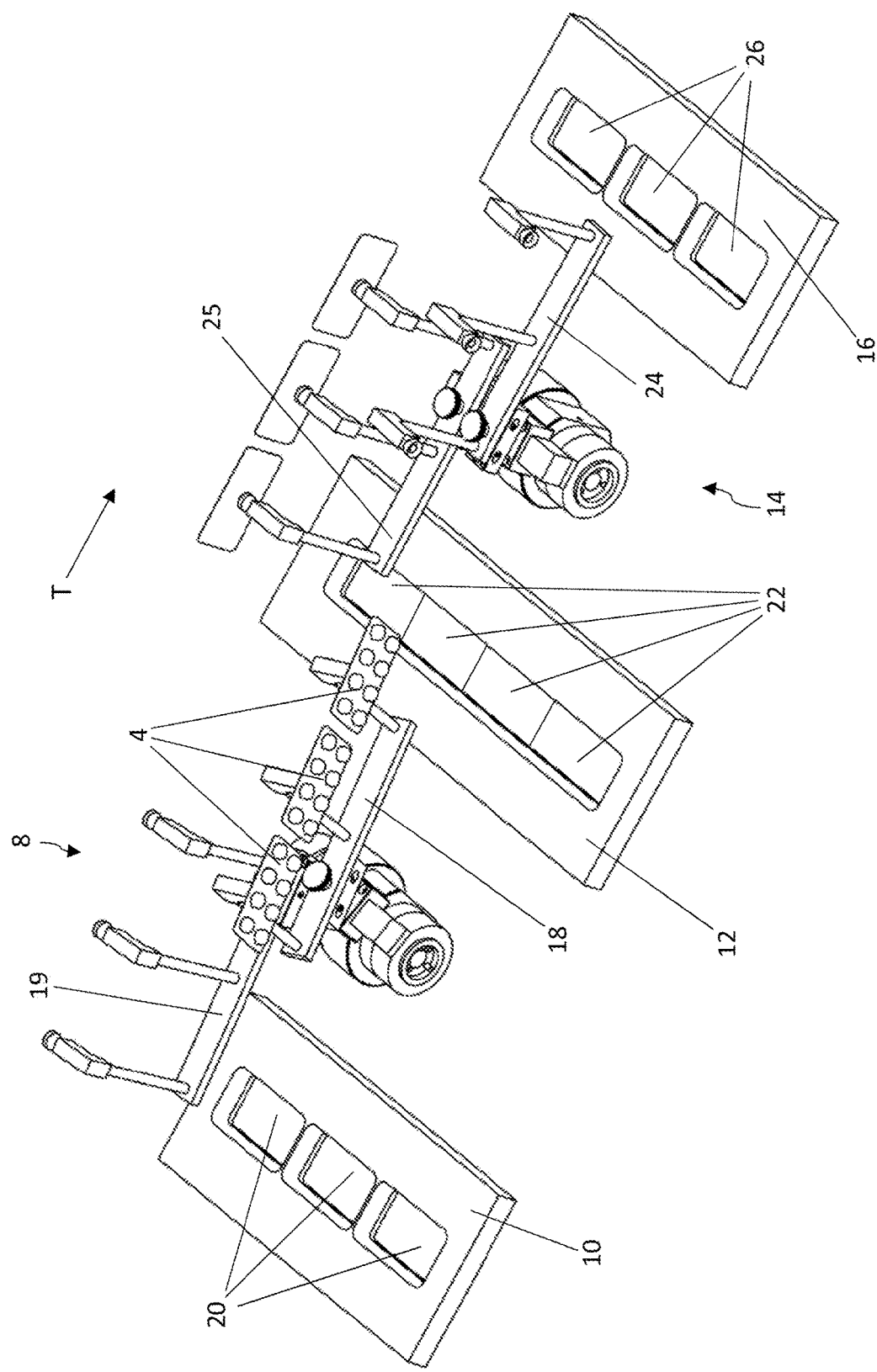
FIGS. 3-6 are schematic, perspective views of the device of FIG. 1, showing various stages of the transfer process.
Figure 4:
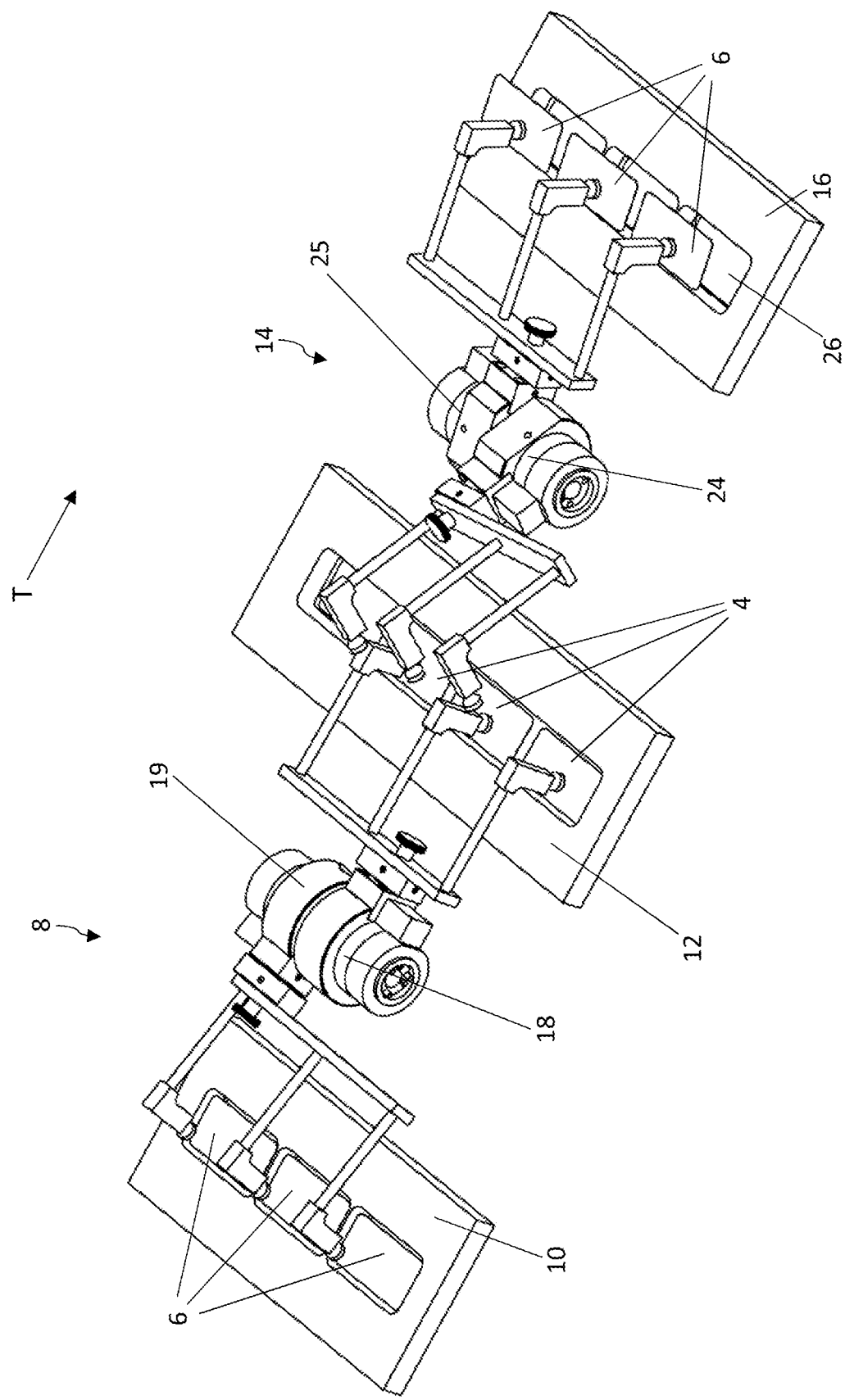
Figure 5:
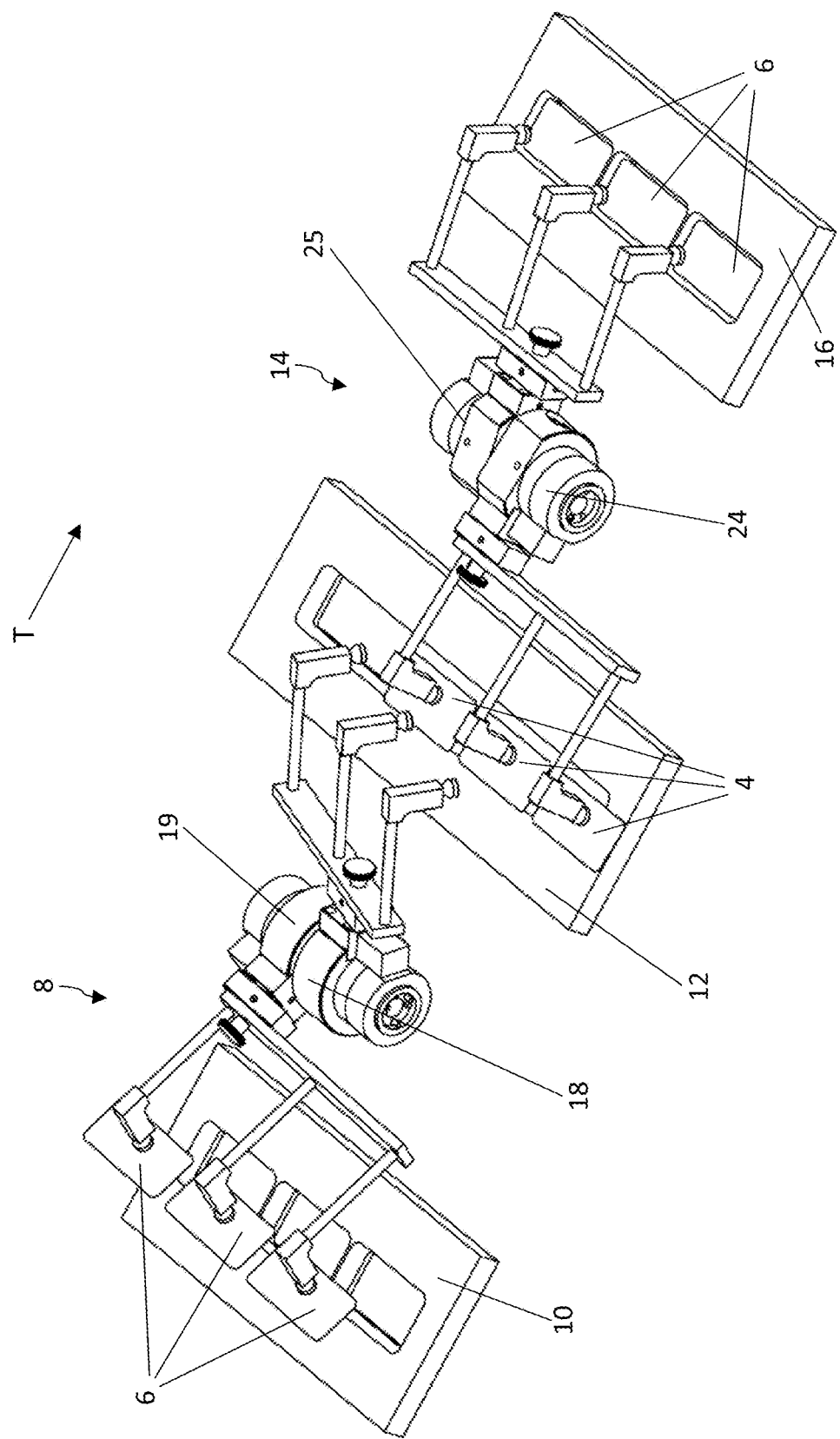
Figure 6:
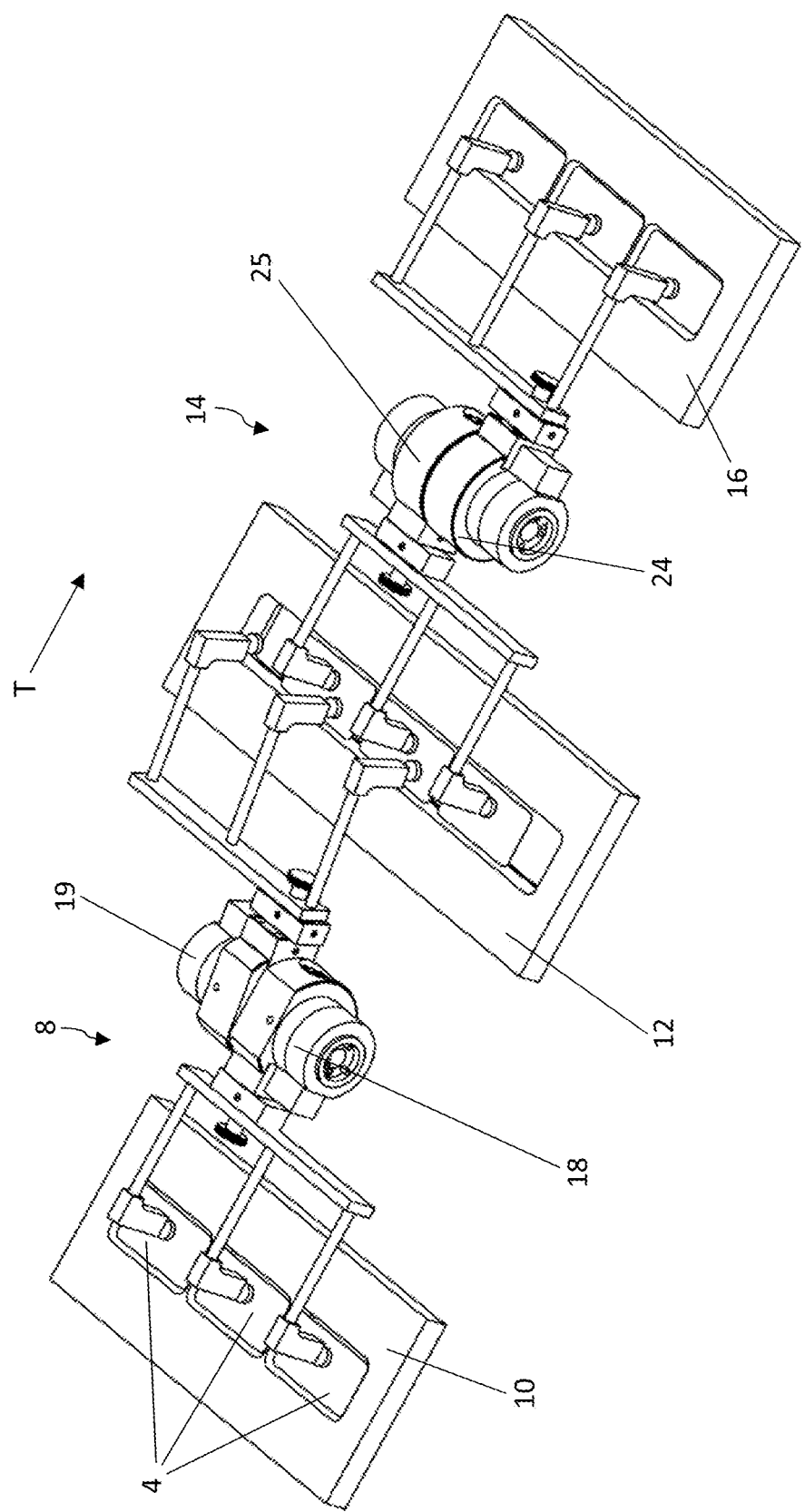

FIG. 1 shows the blister packs 4 immediately after they have left the ready positions 20. In FIG. 3, the blister packs 4 are on their way from the ready positions 20 to the intermediate place positions 22, where they placed as shown in FIG. 4. In FIG. 5, the first suction arm 18 is on its way back to its picking position. The second suction arm 19, meanwhile, is completely the opposite movement. In FIG. 6 the transfer cycle begins again from the beginning.

As previously explained, it would be possible to use only a single suction arm to transfer blister packs 4, 6 from the stamping station 10 to the intermediate place element 12 instead of the two suction arms 18, 19 moving in opposite directions.

As soon as the blister packs 4 are present in the intermediate place positions 22 of the intermediate place position area 23, the first blister packs 4 can be gripped there by the first suction arm 24 of the second transfer unit 14 and transferred to the final place positions 26. The first blister packs 4 in the intermediate place positions 22 are picked from above and also placed from above in the final place positions 26 on the conveying means 16. The first blister packs 4 in the final place positions 26 have the same side facing up as they did when in the intermediate place positions 22 but now with a rotation of 180° around their centers.

For the transfer of the second blister packs 6 from the intermediate place positions 22 of the intermediate place position area 23' to the common final place positions 26 by means of the second suction arm 25, what was said above concerning the transfer of the first blister packs 4 by means of the first suction arm 24 applies here in exactly the same way. The only difference is that the times at which the blister packs 6 are picked and at which the blister packs 6 are placed are substantially opposite to the times at which the first blister packs 4 are picked and placed.

FIG. 1 shows the second blister packs 6 shortly after they have been gripped at the intermediate place positions 22. In FIG. 3, the blister packs 6 are on their way from the intermediate place positions 22 to the final place positions 26, where they are placed shortly after the time shown in FIG. 4. In FIG. 5, the second suction arm 25 is shown shortly after the placing step and is already on its return journey to its picking position. The first suction arm 24, meanwhile, executes the opposite movement. In FIG. 6, the cycle begins again from the beginning. The process can be repeated as often as desired.

The two suction arms 24, 25 complete a pivoting movement around the same first axis A1, whereas the rotational movements of their second segments 31, 33 around their associated second axes A2, A2' proceed in opposite rotational directions. At the vertex of the rotational movement, as shown in the cross section of FIG. 9, the blister packs are preferably parallel to the longitudinal center plane of the transfer unit 14 (see also FIG. 3).

The times at which the blister packs 4, 6 are picked from the intermediate place positions 22 must be coordinated with the times at which the blister packs 4, 6 are placed on the intermediate place positions 22 by the first transfer unit 8. To increase the throughput, it can be effective for one of the suction arms 24, 25 of the second transfer unit 14 to be already picking the corresponding blister packs 4, 6 at the intermediate place positions 22 while the corresponding suction arm 18, 19 of the first transfer unit 24 is still in the area of the intermediate place positions 22. For a case such as this, the suction arms 18, 19, 24, 25 must have a geometry which allows the suction devices 34 of the suction arms 18, 19, 24, 25 to be offset from each other in the area of the intermediate place positions 22 (see FIG. 6).

The structure and drive of the suction arms 18, 19 of the first transfer unit 8 are preferably substantially the same as the structure and drive of the suction arms 24, 25 of the second transfer unit 14, as described in detail above.

Figure 12:
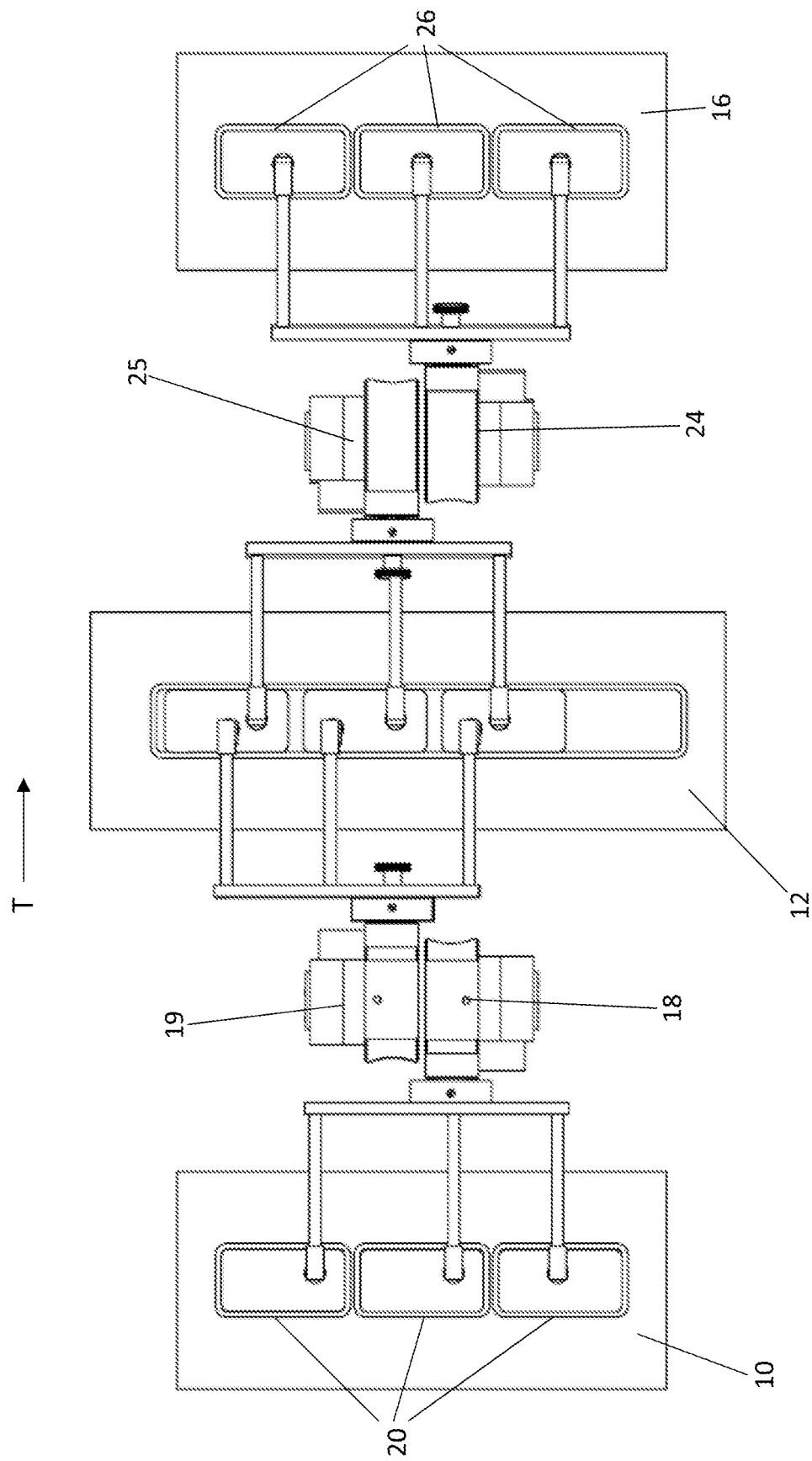
FIG. 12 is a top view of the device of FIG. 11.
Figure 13:
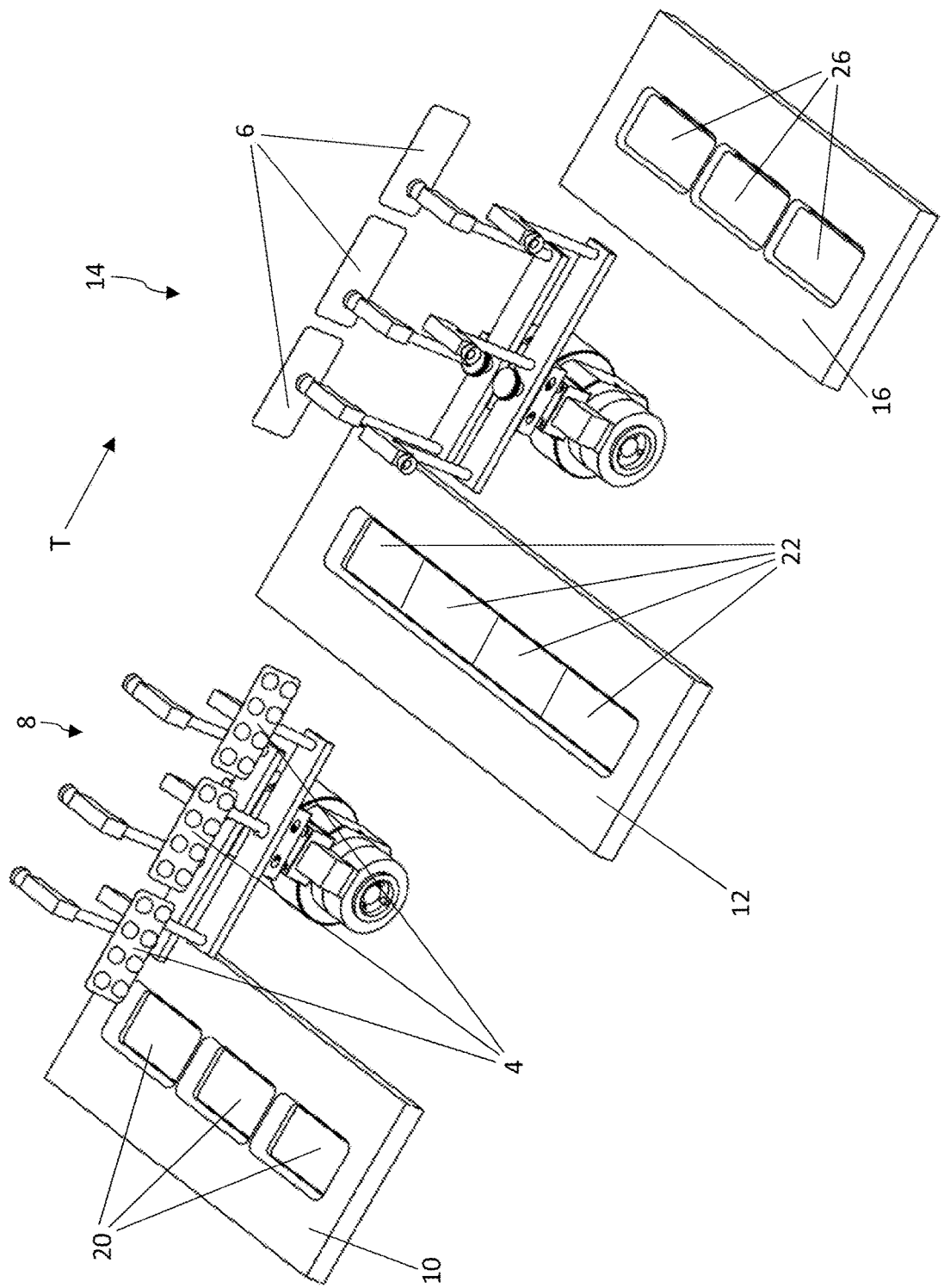
FIGS. 13-15 are schematic diagrams, in perspective, of the device of FIG. 11, showing various stages of the transfer process.
Figure 14:
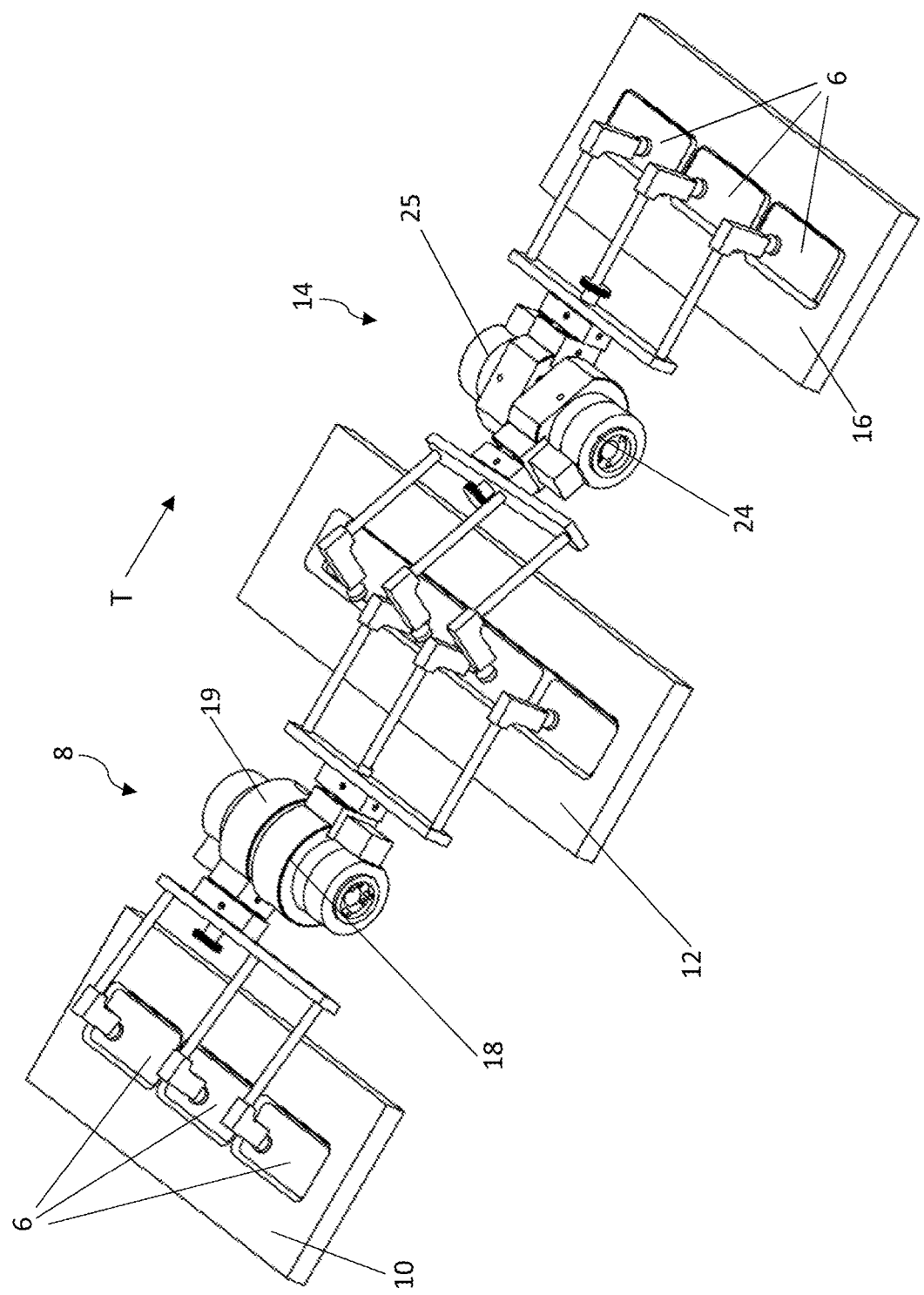
Figure 15:
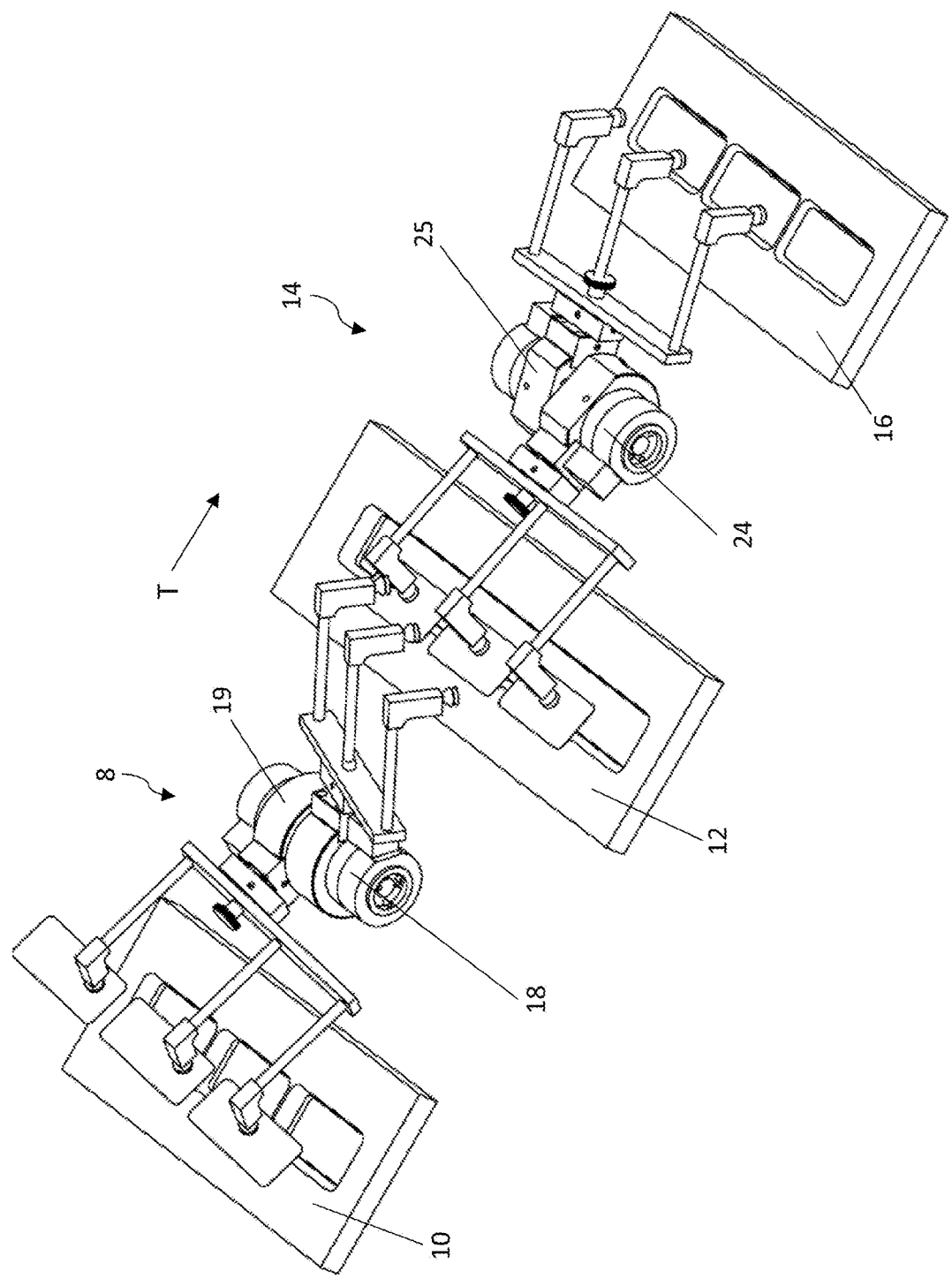
Figure 16:
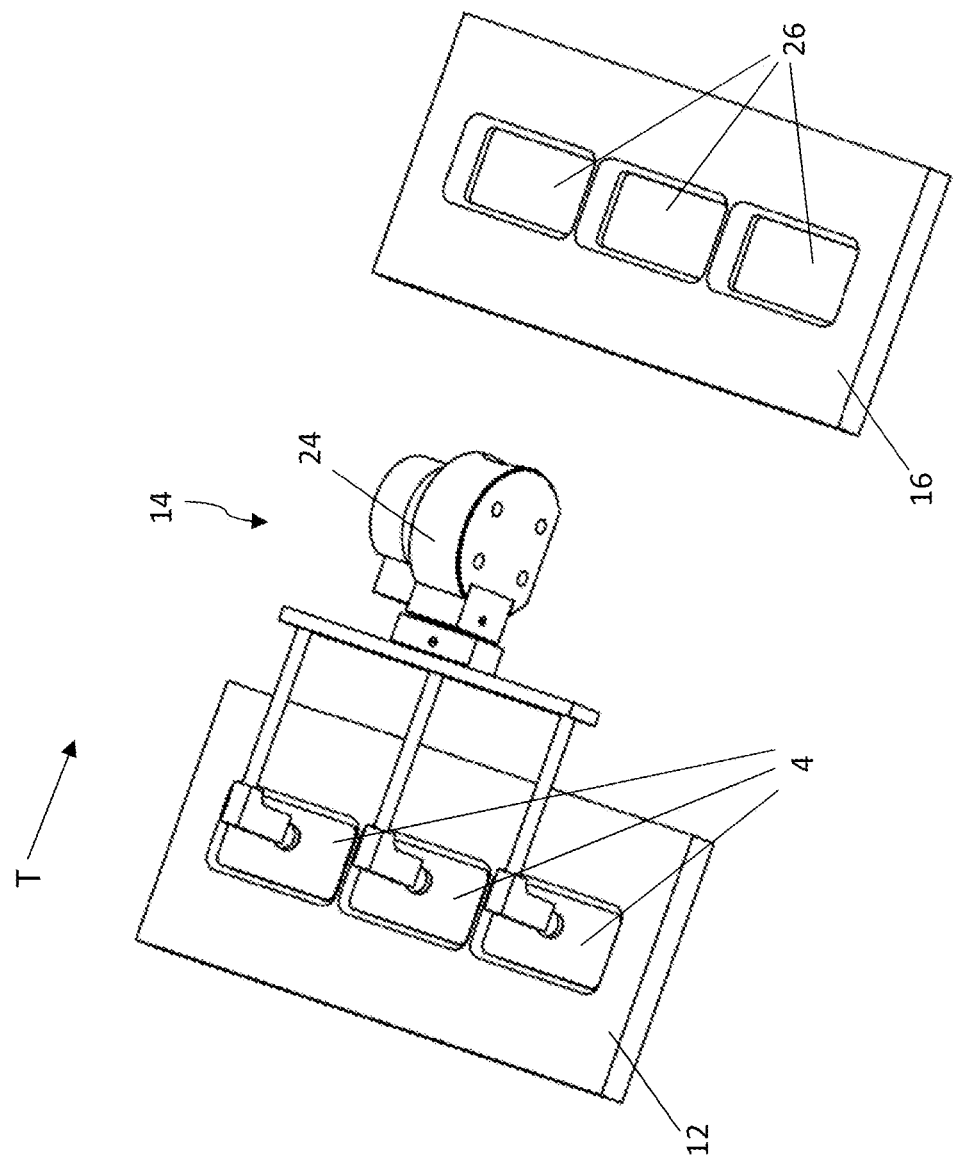
FIG. 16 is a schematic diagram, in perspective, of another variant of a transfer unit according to the present disclosure.
Figure 17:
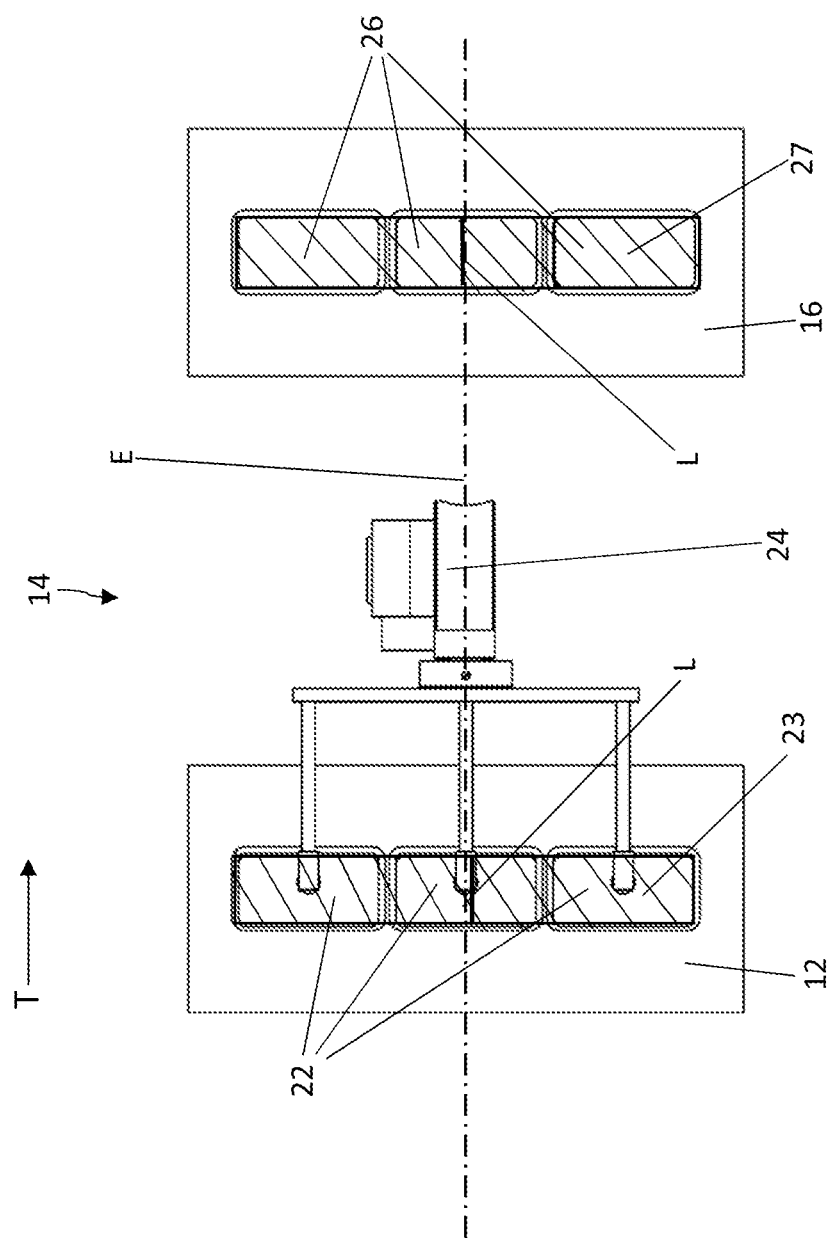
FIG. 17 is a top view of the transfer unit of FIG. 16.
Figure 18:
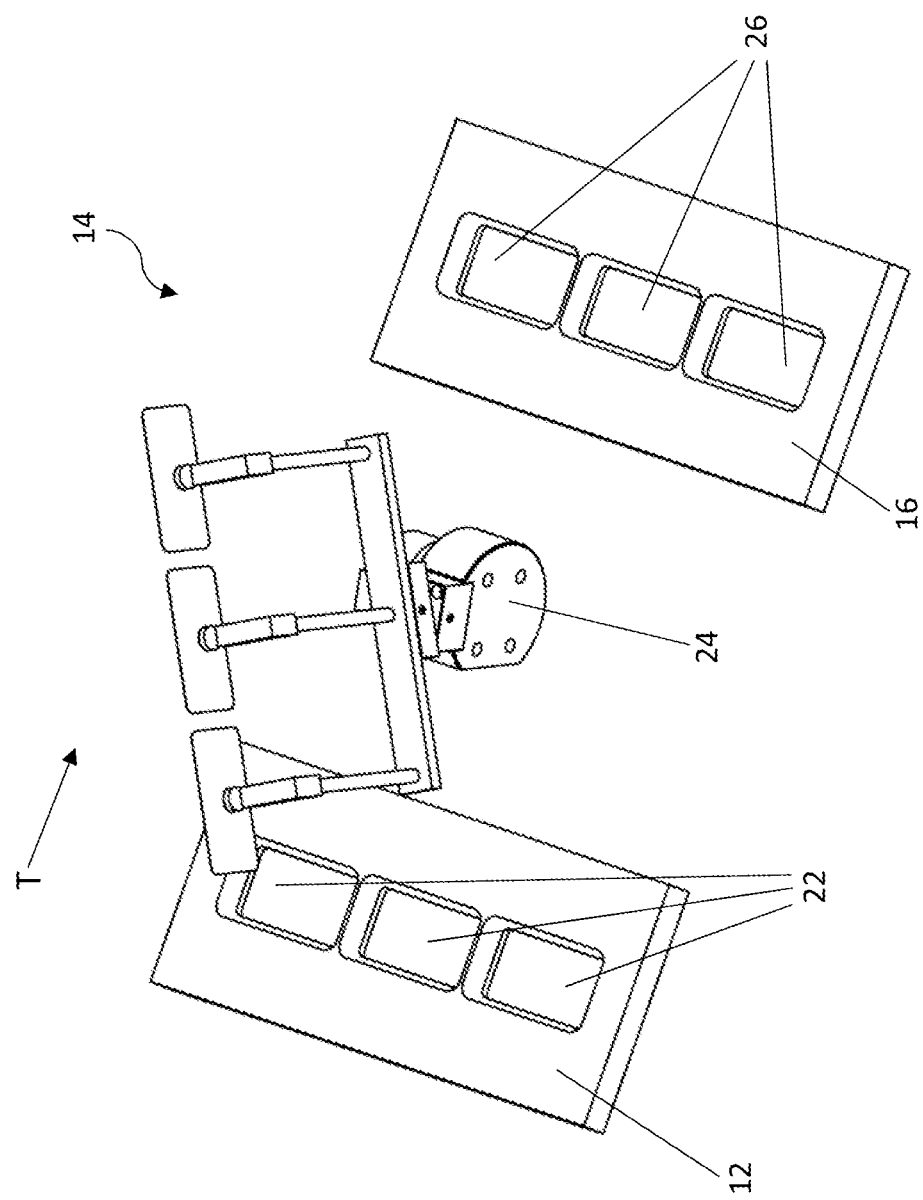
FIGS. 18-20 are schematic diagrams, in perspective, of the transfer unit of FIG. 16, showing various stages of the transfer process.
Figure 19:
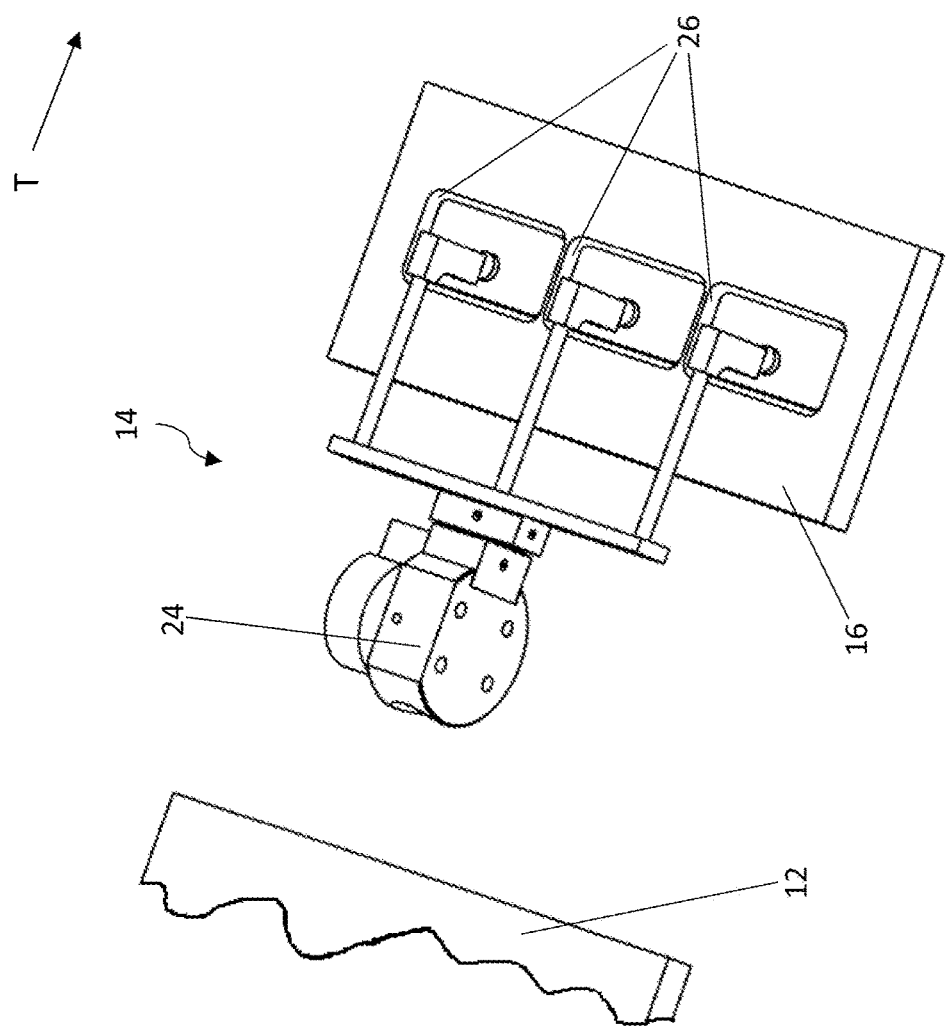
Figure 20:
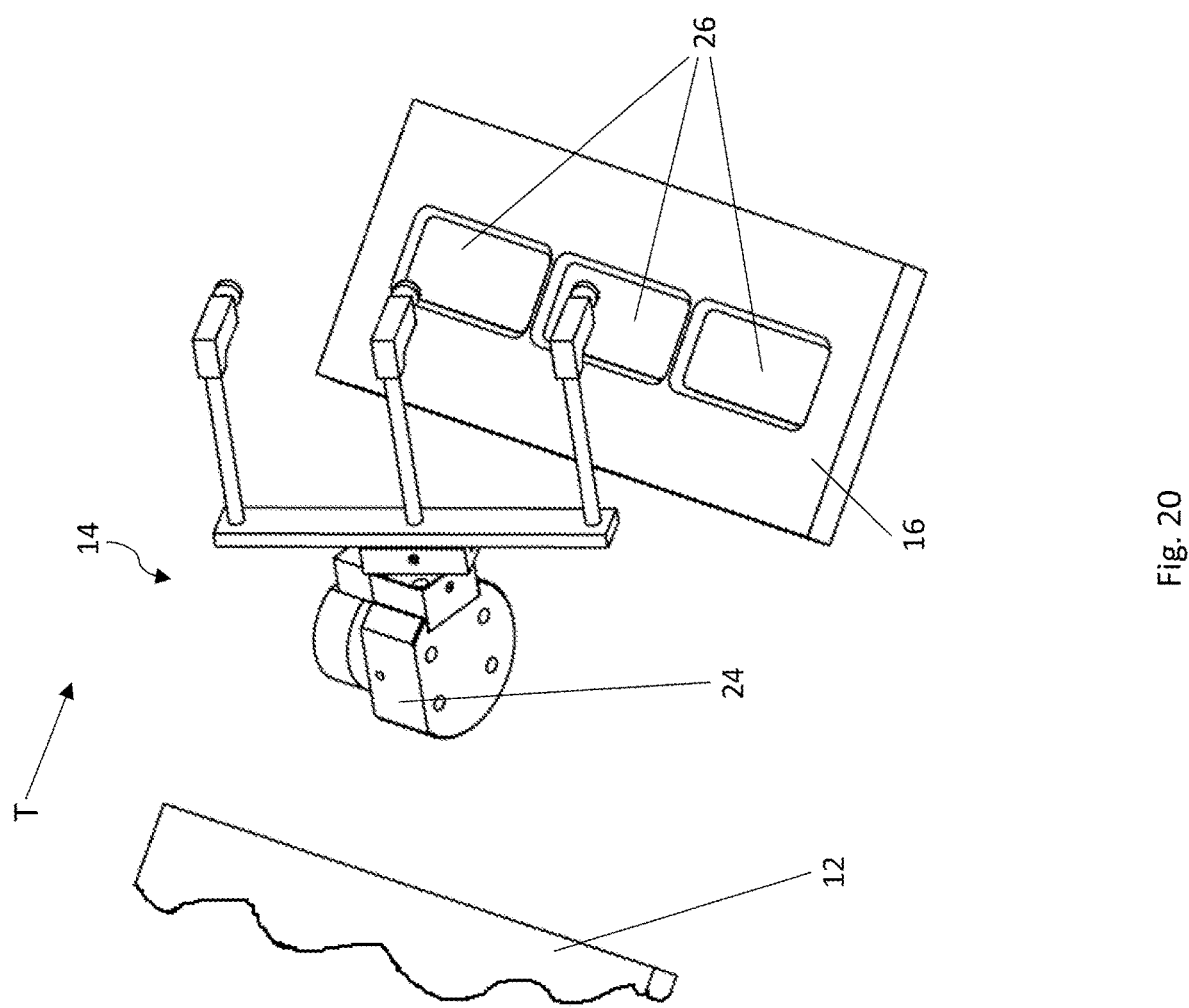

The embodiment according to FIGS. 11-15 differs from the previously described embodiment in that the blister packs 4, 6 become laterally offset transversely to the transfer direction T on their way from the stamping station 10 to the intermediate place element 12; this lateral offset, however, is toward the outside on the left in the case of first suction arm 18 and toward the outside on the right in the case of the second suction arm 19. Another difference is that these lateral offsets are lost again during the transfer of the blister packs 4, 6 from the intermediate place element 12 to the conveying means 16. As can be seen in FIG. 12, the ready positions 20 of the blister packs 4, 6 in the stamping station 10 lie on a line, in the transfer direction T, with the final place positions 26 on the conveying means 16.

The different lateral offsets of the blister packs 4, 6 in comparison to the stepwise offsetting of the blister packs 4, 6 in the embodiment according to FIGS. 1-10 is achieved by the arrangement of the second rotational axes A2, A2' of the second segments 31, 33 of the associated auction arms 18, 19, 24, 25 relative to the center of the ready position area 21, to the center of the intermediate place position area 23, and to the center of the final place position area 27. Otherwise, the structure of the suction arms 18, 19, 24, 25 is preferably identical to that described on the basis of FIGS. 1-10.

In the embodiment of a transfer unit 14 according to FIGS. 16-20, the transfer is accomplished by only a single suction arm 24. Finally, the plane E, in which the second axis A2 of the suction arm 24 moves, intersects the intermediate place positions area 23 and the final place position area 27 along straight lines L, which are centered with respect to the above-cited areas. As a result, the blister packs 4 do not acquire an offset during transfer. The structure and drive of the suction arm 24 are otherwise again preferably identical to those described on the basis of FIGS. 1-10. A configuration like that shown in FIGS. 16-20 is also a possible alternative for the first transfer unit 8. A transfer unit 8, 14 according to FIGS. 16-20 can be combined with a transfer unit 8, 14 according to the present disclosure as shown in FIGS. 1-15 to obtain a device 2.

As previously mentioned, the blister packs 4, 6 in the ready positions 20 are preferably picked from above in all of the embodiments. Under certain circumstances, it is also possible for the blister packs to be provided in the ready positions 20 in a vertical position, for example, or at a certain angle to the vertical instead of in a horizontal orientation. In this case, the suction arms 18, 29 execute a pivoting movement around the first axis A1 only around an angle of less than 180°, usually an angle in the range of 60-180°. The ratio between the bevel gears 56, 60 must then be adapted accordingly to ensure that, during this reduced pivoting movement around the first axis A1, the second segment 31, 33 completes a full 180° rotation around the second axis A2, A2'.

Generally, the blister packs 4, 6 in the ready positions 20 are preferably held in place by suitable retainers until they have been gripped by the suction arms 18, 19. The retainers must release the blister packs 4, 6 at the proper time before the transfer movement. Generally, the blister packs 4, 6 are preferably held in place in the intermediate place positions 22 by suitable retainers, until they have been gripped by the suction arms 24, 25. The retainers must release the blister packs 4, 6 at the proper time before the transfer movement.

In the embodiments of FIGS. 1-15 described above, two suction arms 18, 19; 24, 25 per transfer unit 8, 14 have been described, but it is also conceivable that only one of the described suction arms could be used in one or both of the transfer units 8, 14.

With the transfer units 8, 14 according to the present disclosure, the blister packs acquire a lateral offset during transfer. The ready position area 21 and the intermediate place position area 23, 23' do not lie on a line, and/or the intermediate place positions area 23, 23' and the final place position area 27 do not lie on a line.

As previously mentioned, it is also possible to combine a transfer unit 8, 14 according to the present disclosure as shown in FIGS. 1-15 with a transfer unit 8, 14 according to FIGS. 16-20, i.e., to combine a transfer unit which produces a lateral offset with a transfer unit which does not produce a lateral offset. It is also possible to combine only one suction arm 18, 19, 24, 25 selected from one of the embodiments according to the present disclosure shown in FIGS. 1-15 with a transfer unit 8, 14 according to FIGS. 16-20.

It would also be possible to combine one of the transfer units 8, 14 according to the present disclosure shown in FIG. 1-10 with one of the transfer units 8, 14 according to the present disclosure shown in FIGS. 11-15; to combine only one suction arm from one of the transfer units 8, 14 according to FIGS. 1-10 with one of the transfer units 8, 14 according to the present disclosure shown in FIGS. 1-15; or to combine one of the transfer units 8, 14 according to the present disclosure shown in FIGS. 11-15 with only one suction arm selected from one of the transfer units 8, 14 according to the present disclosure shown in FIGS. 1-10.

In the embodiments illustrated here, three blister packs 4, 6 are transferred simultaneously by means of one suction arm in each case. It is also possible, however, that only two or more than three blister packs 4, 6 could be transferred simultaneously.

The transfer units 8, 14 according to the present disclosure can be used jointly in one device 2. It is also possible, however, to use one transfer unit 8, 14 by itself. In this case, the blister packs 4, 6 do not necessarily have to be placed on an intermediate place element; and it is also possible that the transfer units 8, 14 could be used at other points of the packaging process. Even when only one transfer unit 8, 14 is used, only one suction arm 18, 19, 24, 25 can be provided.

For these reasons, the general terms "pick positions", "pick position area", "place positions", and "place position area" are used in the attached claims. Within the scope of the present description of the figures, which are offered as examples, the claimed "pick positions" are the intermediate place positions 22 of the transfer unit 14 or the ready positions 20 of the transfer unit 8. The intermediate place position area 23, 23' thus formed or the ready position area 21 is therefore the "pick position area". In addition, the claimed "place positions" are the intermediate place positions 22 of the transfer unit 8 or the final place positions 26 of the transfer unit 14. The intermediate place position area 23, 23' thus formed or the final place position area 27 is therefore the "place position area".

The blister packs 4, 6 usually contain tablets, capsules, or sugar-coated pills. The blister packs 4, 6 are usually sealed with a lidding foil, on which the suction heads 36 can act. It is also conceivable that the blister packs 4, 6 could remain open at the top. This is possible especially in cases where not tablets but rather other medical products such as syringes, ampoules, vials or the like have been packaged. In the case of a blister pack 4, 6 without a lidding foil, it is advantageous for the suction heads 36 to be adapted to the shape of the product and to act directly on the product held in place in the blister pockets. The blister packs 4, 6 can also contain nonmedical products.

The invention claimed is:

1. A transfer unit for transferring blister packs comprising:
   a suction arm, which is movable between a picking position, in which the suction arm picks several blister packs from several pick positions which are arranged at a first distance to each other, and a placing position, in which the suction arm places the several blister packs in several place positions which are arranged at a second distance to each other, wherein the first and second distances are identical;
   wherein the suction arm comprises a first segment and a second segment, wherein the first segment is mounted rotatably around an associated first axis;
   wherein the first segment of the suction arm comprises a section to which the second segment is attached such that the second segment is rotatable around a non-stationary second axis substantially perpendicular to the first axis, wherein a suction device for sucking and holding the blister packs is arranged on the second segment;
   wherein the suction arm is configured and actuated such that a movement of the suction arm from the picking position to the placing position and back is a combined movement, which comprises at least a first rotational movement of the first segment and the second segment around the first axis and a second rotational movement of the second segment around the second axis;
   wherein the suction arm is configured and actuated such that the blister packs in the pick positions are picked simultaneously from above by the suction device of the suction arm and are also placed simultaneously in the place positions;
   wherein the several pick positions are arranged next to each other in a first row and jointly form a pick position area, and wherein the several place positions are arranged next to each other in a second row and jointly form a place position area, wherein the first and second rows are parallel to each other, and wherein the second row of blister packs in the place positions are laterally offset in the direction of the second row relative to the first row of blister packs in the pick positions; and
   wherein the second axis of the suction arm is arranged such that, during the first rotational movement of the first segment of the suction arm, the second axis moves in a plane which intersects the pick position area or a lateral projection thereof along a straight line, which is laterally offset from a center of the pick position area.

2. The transfer unit of claim 1, wherein the second segment and thus the blister packs held on the suction device execute a rotational movement of substantially 180° around the second axis when the suction arm moves from the picking position to the placing position or vice versa.

3. The transfer unit of claim 1, wherein the first segment executes a rotational movement of 60-180° around the first axis when the suction arm moves from the picking position to the placing position or vice versa.

4. The transfer unit of claim 1, wherein the first segment executes a rotational movement of 120-180° around the first axis when the suction arm moves from the picking position to the placing position or vice versa.

5. The transfer unit of claim 1, wherein the suction arm is configured and actuated such that the blister packs in the pick positions are picked from above by the suction device of the suction arm and are also placed from above in the place positions.

6. The transfer unit of claim 1, wherein the suction arm is supported shiftably in a direction parallel to the first axis.

7. The transfer unit of claim 1, wherein the suction device comprises several suction heads, which are attached to the second segment by at least one support arm.

8. The transfer unit of claim 7, wherein the at least one support arm is rigidly attached to the second segment.

9. The transfer unit of claim 7, wherein the at least one support arm projects downward at a slant from the second segment in the picking position and in the placing position.

10. A method for transferring blister packs from several pick positions to several place positions by means of a transfer unit, comprising the steps of:
    picking several blister packs from the several pick positions, wherein the blister packs in the pick positions are arranged next to each other in a first row; moving the blister packs; and placing the blister packs in the several place positions; wherein the blister packs in the place positions are arranged next to each other in a second row which is parallel to the first row of blister packs in the pick positions;
    wherein the blister packs in the pick positions are picked simultaneously and are also placed simultaneously in the place positions, and wherein the blister packs in the place positions are rotated 180° around their centers in comparison to an orientation of the blister packs in the pick positions; and
    wherein the second row of blister packs in the place positions are laterally offset in a direction of the second row relative to the first row of blister packs in the pick positions.

11. The method of claim 10, wherein the picking of the blister packs from the pick positions, the moving, and the placing in the place positions are performed by a suction arm, which executes a back-and-forth pivoting movement.

12. The method of claim 10, wherein, in the case of an even number of blister packs, all of the blister packs are placed in place positions which are exchanged in comparison to the pick positions; or wherein, in the case of an odd number of blister packs, all of the blister packs except for a central blister pack are placed in place positions which are exchanged in comparison to the pick positions.

13. The method of claim 10, wherein the blister packs in the pick positions are picked from above, and wherein the blister packs in the pick positions and in the place positions are arranged with a same side facing up in each case.

* * * * *